(12) United States Patent
Sybert et al.

(10) Patent No.: US 9,012,550 B2
(45) Date of Patent: *Apr. 21, 2015

(54) FLAME RETARDANT POLYCARBONATE COMPOSITIONS, METHODS OF MANUFACTURE, AND ARTICLES FORMED THEREFROM

(71) Applicant: SABIC Innovative Plastics IP B.V., Bergen op Zoom (NL)

(72) Inventors: Paul Dean Sybert, Evansville, IN (US); Laura G. Schultz Hume, Evansville, IN (US); James Franklin Hoover, Evansville, IN (US)

(73) Assignee: SABIC Global Technologies B.V. (NL)

( * ) Notice: Subject to any disclaimer, the term of this patent is extended or adjusted under 35 U.S.C. 154(b) by 0 days.

This patent is subject to a terminal disclaimer.

(21) Appl. No.: 13/930,313

(22) Filed: Jun. 28, 2013

(65) Prior Publication Data

US 2013/0284991 A1 Oct. 31, 2013

Related U.S. Application Data

(60) Division of application No. 13/251,137, filed on Sep. 30, 2011, which is a continuation-in-part of application No. 13/207,930, filed on Aug. 11, 2011, now Pat. No. 8,703,855.

(30) Foreign Application Priority Data

Mar. 31, 2011 (IN) .............................. 920/DEL/2011

(51) Int. Cl.
| | |
|---|---|
| C08F 283/02 | (2006.01) |
| C08K 3/22 | (2006.01) |
| C08L 69/00 | (2006.01) |
| C09K 21/14 | (2006.01) |
| C08L 83/10 | (2006.01) |
| C08G 77/00 | (2006.01) |

(52) U.S. Cl.
CPC ............... *C09K 21/14* (2013.01); *C08G 77/80* (2013.01); *C08L 69/00* (2013.01); *C08L 83/10* (2013.01)

(58) Field of Classification Search
USPC .......... 525/101, 102, 463, 464; 524/431, 537; 428/412, 413
See application file for complete search history.

(56) References Cited

U.S. PATENT DOCUMENTS

| | | | |
|---|---|---|---|
| 3,751,400 A | 8/1973 | Crennan et al. | |
| 3,929,908 A | 12/1975 | Orlando et al. | |
| 4,170,711 A | 10/1979 | Orlando et al. | |
| 4,404,350 A | 9/1983 | Ryang | |
| 4,443,581 A | 4/1984 | Robeson et al. | |
| 4,923,933 A | 5/1990 | Curry | |
| 5,451,632 A | 9/1995 | Okumura et al. | |
| 6,031,036 A | 2/2000 | Rosenquist et al. | |
| 6,140,399 A | 10/2000 | Munro | |
| 6,462,111 B1 | 10/2002 | Singh et al. | |
| 6,723,864 B2 | 4/2004 | Silva et al. | |
| 6,753,367 B2 | 6/2004 | Goossens et al. | |
| 6,822,041 B2 | 11/2004 | Schottland et al. | |
| 6,833,422 B2 | 12/2004 | Silva et al. | |
| 7,253,223 B2 | 8/2007 | Kawato et al. | |
| 7,652,107 B2 | 1/2010 | Gallucci et al. | |
| 7,790,292 B2 | 9/2010 | Colborn et al. | |
| 2006/0030664 A1 | 2/2006 | Kim | |
| 2007/0135569 A1 | 6/2007 | DeRudder | |
| 2008/0230751 A1 | 9/2008 | Li et al. | |
| 2009/0043053 A1 | 2/2009 | Gorny et al. | |
| 2010/0075125 A1* | 3/2010 | Maas et al. .................... | 428/220 |
| 2011/0098386 A1 | 4/2011 | Krauter et al. | |
| 2012/0248384 A1 | 10/2012 | Van De Wetering et al. | |

FOREIGN PATENT DOCUMENTS

| | | |
|---|---|---|
| DE | 102008054329 A1 | 5/2010 |
| EP | 0524731 A1 | 1/1993 |
| EP | 0899306 B1 | 11/2004 |
| EP | 1555296 A1 | 7/2005 |
| WO | 2005037921 A1 | 4/2005 |
| WO | 2010005486 A3 | 1/2010 |

OTHER PUBLICATIONS www.sabic-ip.com (SABIC Innovative Plastics, Purity and Performance, Specialty Additives & Intermediates, pp. 1-20).*
Innes et al., "Flame retardants for polycarbonate—new and classical solutions", Plastics Additives & Compounding, Jan.-Feb. 2006: pp: 26-29.
LEXAN EXL9930 Catalog, 2004, pp. 1-6.
LEXAN Resin FST9705 Datasheet. Last updated Jan. 6, 2011, 2 pages.
International Search Report of the International Searching Authority; International Application No. PCT/US2012/031148, International Filing Date: Mar. 29, 2012 Date of Mailing: Jul. 10, 2012, 4 Pages.
Written Opinion of the International Searching Authority; Application No. PCT/US2012/031148, International Filing Date Mar. 29, 2012, Date of Mailing: Jul. 10, 2012, 7 Pages.

* cited by examiner

*Primary Examiner* — Ana Woodward
(74) *Attorney, Agent, or Firm* — Cantor Colburn LLP

(57) ABSTRACT

A composition comprising: a first polycarbonate comprising a poly(siloxane-carbonate); a second polycarbonate different from the first polycarbonate; and optionally, a third polycarbonate different from the first and second polycarbonate; wherein the first polycarbonate is present in an amount effective to provide the siloxane units of in the first polycarbonate in an amount of at least 0.3 wt %, and the second polycarbonate is present in an amount effective to provide the bromine of the second polycarbonate in an amount of at least 7.8 wt %; and further wherein an article molded from the composition has an OSU integrated 2 minute heat release test value of less than 65 kW-min/m² and a peak heat release rate of less than 65 kW/m², and an E662 smoke test Dmax value of less than 200.

34 Claims, No Drawings

FLAME RETARDANT POLYCARBONATE COMPOSITIONS, METHODS OF MANUFACTURE, AND ARTICLES FORMED THEREFROM

CROSS-REFERENCE TO RELATED APPLICATION

This application is a divisional of U.S. patent application Ser. No. 13/251,137, filed Sep. 30, 2011, which is a continuation-in-part of U.S. patent application Ser. No. 13/207,930, filed Aug. 11, 2011, which claims priority to India Patent Application No. 920/DEL/2011, filed Mar. 31, 2011, the contents of all of which are incorporated by reference herein in their entirety.

BACKGROUND OF THE INVENTION

This disclosure generally relates to polycarbonate compositions, and more particularly to flame retardant polycarbonate compositions containing specific combinations of polycarbonates.

Flame retardant (FR) polycarbonates and polycarbonate blends with UL V0 and 5V A and B Underwriters Laboratories flammability ratings are widely prepared and used, especially in a wide variety of electrical and electronic applications. Conversely, only a very limited set of polycarbonates are used in aircraft and other transportation applications particularly interior parts such as windows, partition walls, ceiling panels, cabinet walls, storage compartments, galley surfaces, light panels, and the like. All of these applications have stringent flammability safety requirements that the polycarbonates must meet. Particular requirements include smoke density, flame spread, and heat release values. In the United States, Federal Aviation Regulation (FAR) Part 25.853 sets forth the airworthiness standards for aircraft compartment interiors. The safety standards for aircraft and transportation systems used in the United States include a smoke density test specified in FAR 25.5 Appendix F, Part V Amdt 25-116. Flammability requirements include the "60 second test" specified in FAR 25.853(a) Appendix F, Part I, (a),1,(i) and the heat release rate standard (referred to as the OSU 65/65 standard) described in FAR F25.4 (FAR Section 25, Appendix F, Part IV), or the French flame retardant tests such as, NF-P-92-504 (flame spread) or NF-P-92-505 (drip test). In another example, the aircraft manufacturer Airbus has smoke density and other safety requirements set forth in ABD0031. In the event of a fire, components made from materials having these properties can increase the amount of time available for escape and provide for better visibility during a fire Despite extensive investigation, current materials that meet these FAR standards could be further improved with respect to other properties. Thus, there is a perceived need for polysulfones having improved melt flow, improved ultraviolet (UV) stability, and improved light transmission. Siloxane-polyestercarbonates have low melt flow and good color stability to indoor light, but may shift in color upon exposure to UV light. Certain polycarbonate-polyetherimide blends also have low melt flow, but can be difficult to formulate so as to provide bright white compositions.

In view of the current interior material safety standards, and in anticipation of more stringent standards in the future, materials that exceed governmental and aircraft manufacturer flame safety requirements are sought. Such materials should also advantageously maintain excellent physical properties, such as toughness (high impact strength and high ductility). It would be a further advantage if such materials could be manufactured to be colorless and transparent. Still other advantageous features include good processability for forming articles, smooth surface finish, and light stability.

BRIEF SUMMARY OF THE INVENTION

Disclosed herein is a polycarbonate composition comprising: a first polycarbonate comprising a poly(siloxane-carbonate) derived from at least one dihydroxy aromatic containing polycarbonate unit, and at least one polysiloxane bisphenol of formula (1), formula (2), or a combination thereof

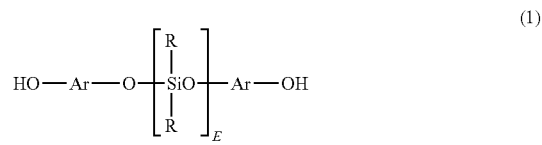

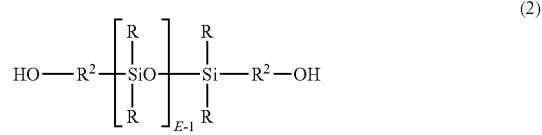

wherein R is each independently a $C_1$-$C_{30}$ hydrocarbon group, $R^2$ is each independently a $C_7$-$C_{30}$ hydrocarbon group, Ar is a $C_6$-$C_{30}$ aromatic group, and E has an average value of 5 to 200; a second polycarbonate different from the first polycarbonate, the second polycarbonate comprising brominated carbonate units derived from 2,2',6,6'-tetrabromo-4,4'-isopropylidenediphenol and carbonate units derived from at least one dihydroxy aromatic compound that is not 2,2',6,6'-tetrabromo-4,4'-isopropylidenediphenol; and optionally a third polycarbonate different from the first and second polycarbonate; wherein the wt % of the first polycarbonate, second polycarbonate, and optional third polycarbonate sum to 100 wt %, the first polycarbonate is present in an amount effective to provide the siloxane units of the first polycarbonate in an amount of at least 0.3 wt %, based on the sum of the wt % of the first, second, and optional third polycarbonate, and the second polycarbonate is present in an amount effective to provide the bromine of the second polycarbonate in an amount of at least 7.8 wt %, based on the sum of the wt % of the first, second, and optional third polycarbonate; and further wherein an article molded or formed from the composition has an OSU integrated 2 minute heat release test value of less than 65 kW-min/m² and a peak heat release rate of less than 65 kW/m² as measured using the method of FAR F25.4, in accordance with Federal Aviation Regulation FAR 25.853 (d), and an E662 smoke test Dmax value of less than 200 when tested at a thickness of 1.6 mm.

In another embodiment, a polycarbonate composition comprises: a first polycarbonate comprising a poly(siloxane-carbonate) derived from at least one dihydroxy aromatic containing polycarbonate unit, and at least one polysiloxane bisphenol of formula (1), formula (2), or a combination thereof

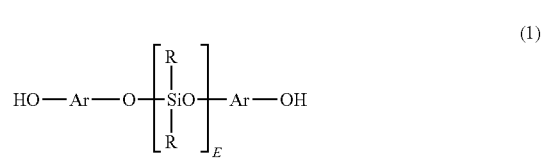

-continued

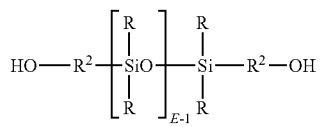

wherein R is each independently a $C_1$-$C_{30}$ hydrocarbon group, Ar is a $C_6$-$C_{30}$ aromatic group, $R^2$ is each independently a $C_7$-$C_{30}$ hydrocarbon group, and E has an average value of 5 to 75, specifically 5 to 15; a second polycarbonate different from the first polycarbonate, the second polycarbonate comprising brominated carbonate units derived from 2,2',6,6'-tetrabromo-4,4'-isopropylidenediphenol and carbonate units derived from at least one dihydroxy aromatic compound that is not 2,2',6,6'-tetrabromo-4,4'-isopropylidenediphenol; and optionally a third polycarbonate different from the first and second polycarbonate; wherein the wt % of the first polycarbonate, second polycarbonate, and optional third polycarbonate sum to 100 wt %, the first polycarbonate is present in an amount effective to provide the siloxane units of the first polycarbonate in an amount of at least 0.3 wt %, based on the sum of the wt % of the first, second, and optional third polycarbonate, and the second polycarbonate is present in an amount effective to provide bromine in the second polycarbonate in an amount of at least 5.0 wt %, based on the sum of the wt % of the first, second, and optional third polycarbonate; and further wherein an article molded from the composition has an OSU integrated 2 minute heat release test value of less than 65 kW-min/m² and a peak heat release rate of less than 65 kW/m² as measured using the method of FAR F25.4, in accordance with Federal Aviation Regulation FAR 25.853 (d), an E662 smoke test Dmax value of less than 200 when tested at a thickness of 1.6 mm; and a haze of less than 3% and a transmission greater than 85%, each measured using the color space CIE1931 (Illuminant C and a 2° observer), or according to ASTM D 1003-07 using illuminant C at a 0.062 inch (1.5 mm) thickness.

In another embodiment, a polycarbonate composition comprises: a first polycarbonate comprising a poly(siloxane-carbonate) derived from at least one dihydroxy aromatic containing polycarbonate unit, and at least one polysiloxane bisphenol of formula (1), formula (2), or a combination thereof

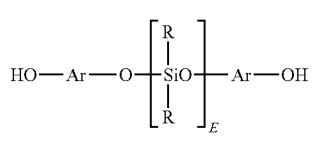

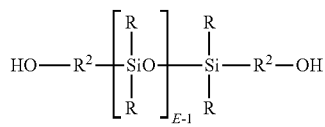

wherein R is each independently a $C_1$-$C_{30}$ hydrocarbon group, Ar is a $C_6$-$C_{30}$ aromatic group, $R^2$ is each independently a $C_7$-$C_{30}$ hydrocarbon group, and E in formula (1) and formula (2) has an average value of 10 to 200; a brominated oligomer having a weight average molecular weight (Mw) of less than 15,000 Daltons as measured by gel permeation chromatography using polystyrene standards; and optionally an additional polycarbonate different from the first polycarbonate and the brominated oligomer; wherein the wt % of the first polycarbonate, brominated oligomer, and optional additional polycarbonate sum to 100 wt %, the first polycarbonate is present in an amount effective to provide the siloxane units of the first polycarbonate in an amount of at least 0.4 wt %, based on the sum of the wt % of the first, second, and optional third polycarbonate, and the brominated oligomer is present in an amount effective to provide the bromine of the brominated oligomer in an amount of at least 7.8 wt %, based on the sum of the wt % of the first polycarbonate, brominated oligomer, and optional additional polycarbonate; and further wherein an article molded or formed from the composition has an OSU integrated 2 minute heat release test value of less than 65 kW-min/m² and a peak heat release rate of less than 65 kW/m² as measured using the method of FAR F25.4, in accordance with Federal Aviation Regulation FAR 25.853 (d), and an E662 smoke test Dmax value of less than 200 when tested at a thickness of 1.6 mm.

Also described is a method of manufacture of the above-described compositions.

Articles comprising the above-described compositions are further disclosed, as well as methods for the manufacture of the articles.

The above described and other features are exemplified by the following Detailed Description and Examples.

DETAILED DESCRIPTION OF THE INVENTION

The inventors hereof have discovered that flame retardant, low smoke polycarbonate compositions can unexpectedly be obtained when two specific polycarbonate compositions, neither of which meets certain low smoke standards and low heat release standards, are used in combination. In particular, certain polysiloxane block co-polycarbonates and certain bromine-containing polycarbonate compositions do not, by themselves, meet strict low smoke density standards when burned. However, specific combinations of these two compositions can meet the low smoke density standards, and have very low heat release properties.

Achieving very low smoke density and very low flammability ratings are conflicting requirements. Halogenated, specifically brominated, flame retardants are used in polycarbonate compositions for their effectiveness in improving flame spread properties and satisfying the stringent aircraft and rail interior flammability standards. Brominated flame retardant additives, however, cause an increase in smoke when the sheet compositions are ignited. It is therefore surprising that polycarbonate compositions containing brominated flame retardants can be added to a polysiloxane block co-polycarbonates and lower the smoke density of the polysiloxane block co-polycarbonates.

The compositions can further have excellent impact strength and low brittleness (high ductility). In a further advantageous feature, the combinations can be transparent. In another advantageous feature, the compositions can have low density. Such compositions are especially useful in the manufacture of flame retardant, low smoke polycarbonate sheets that can be used, for example, in aircraft, train, marine, or other transportation applications.

In an embodiment, the polycarbonate compositions contain a first polycarbonate (certain poly(siloxane-carbonate)s as further described below), a second polycarbonate (certain brominated polycarbonates as further described below), and optionally a third polycarbonate different from the first and the second polycarbonates, in amounts effective to satisfy at least the smoke generation requirements of the American Society for Testing and Materials (ASTM) standard E662

(2006). This test method uses a photometric scale to measure the density of smoke generated by the material during burning. Polycarbonate compositions satisfying the smoke generation requirements for aircraft interiors have a smoke density of less than 200, in accordance with ASTM E662 (2006). For simplicity, this test can be referred to herein as the "smoke density test."

The first, second, and optional third polycarbonate are further selected and used in amounts effective to satisfy the heat release rates described in FAR F25.4 (Federal Aviation Regulations Section 25, Appendix F, Part IV). Materials in compliance with this standard are required to have a 2-minute integrated heat release rate of less than or equal to 65 kilowatt-minutes per square meter (kW-min/m$^2$) and a peak heat release rate of less than 65 kilowatts per square meter (kW/m$^2$) determined using the Ohio State University calorimeter, abbreviated as OSU 65/65 (2 min/peak). In applications requiring a more stringent standards, where a better heat release rate performance is called for, a 2-minute integrated heat release rate of less than or equal to 55 kW-min/m$^2$ and a peak heat release rate of less than 55 kW/m$^2$ (abbreviated as OSU 55/55) may be required.

Without being bound by theory, it is believed that the unexpected combination of low smoke density and low heat release values are obtained by careful selection and balancing of the absolute and relative amounts of the first, second, and optionally third polycarbonates, including selecting an amount of first polycarbonate and the block size of the siloxane blocks in the first polycarbonate to provide at least 0.3 weight percent (wt %) of siloxane units in the composition, and selecting the amount the second polycarbonate and the amount of bromine in the second polycarbonate to provide at least 7.8 wt % of bromine in the composition. The compositions therefore include amounts of the first and second polycarbonates (or as described below, other brominated oligomer) effective, i.e., sufficient to provide the desired amount of siloxane units and bromine, which in turn yields a composition having the an OSU integrated 2 minute heat release test value of less than 65 kW-min/m$^2$ and a peak heat release rate of less than 65 kW/m$^2$ as measured using the method of FAR F25.4, in accordance with Federal Aviation Regulation FAR 25.853 (d), and an E662 smoke test $D_{max}$ value of less than 200 when tested at a thickness of 1.6 mm. In an embodiment, an effective amount of the first polycarbonate copolymer is at least 5 wt %, based on the total weight of the first polycarbonate, second polycarbonate, and optional third polycarbonate. The precise amount of the first polycarbonate effective to provide at least 0.3 wt % of the siloxane units, depends on the selected polycarbonate, the length of the siloxane block, and desired properties, such as smoke density, heat release values, transparency, impact strength, and/or other desired physical properties. In general, to be effective, the smaller the block size and/or the lower the number of blocks in the first polycarbonate, the higher the fractional concentration of the first polycarbonate, based on the total weight of the first, second and optionally third polycarbonates. Similarly, the lower the weight percent of bromine in the second polycarbonate, the higher the fractional concentration of the second polycarbonate, based on the total weight of the first, second and optionally third polycarbonate.

Thus in particular in this embodiment, the polycarbonate composition comprises at least 5 wt %, specifically 5 to 80 wt %, or at least 10 wt %, specifically 10 to 70 wt %, or at least 15 wt %, specifically 15 to 60 wt % of the first poly(siloxane-carbonate), at least 20 wt %, specifically 20 to 95 wt % of the second brominated polycarbonate, in particular a brominated polycarbonate derived from 2,2',6,6'-tetrabromo-4,4'-isopropylidenediphenol (2,2-bis(3,5-dibromo-4-hydroxyphenyl) propane (TBBPA) and carbonate units derived from at least one dihydroxy aromatic compound that is not TBBPA ("TBBPA copolymer"), and 0 to 70 wt % of the optional third polycarbonate, based on the total weight of the first, second, and optional third polycarbonate, i.e., the wt % of the first polycarbonate, second polycarbonate, and optional third polycarbonate sum to 100 wt %. The siloxane blocks have an average of 5 to 200 units, specifically 5 to 100 units. At least 0.3 wt % of siloxane and at least 7.8 wt % of bromine is present, each based on total weight of the first polycarbonate, second polycarbonate, and optional third polycarbonate.

Further in this embodiment, when the siloxane blocks have an average of 25 to 75 units, specifically 25 to 50 units, and at least 2.0 wt % of siloxane is present based on total weight of the first polycarbonate, second polycarbonate, and optional third polycarbonate, excellent toughness is obtained, in particular an article molded from the composition further has a room temperature notched Izod impact of greater than 500 J/m as measured according to ASTM D 256-10 at a 0.125 inch (3.2 mm) thickness. The articles can further have 100% ductility. The amount of siloxane in the composition can be Still further in this embodiment, when the siloxane units of the first polycarbonate are present in an amount of at least 2.0 wt % of the first polycarbonate and the composition has 35 to 50 wt % of the second polycarbonate (the TBBPA copolymer), each based on total weight of the first polycarbonate, second polycarbonate, and optional third polycarbonate, and the siloxane blocks have an average length of 25 to 50 units, excellent transparency can be obtained, in particular an article molded from this composition has a haze of less than 10% and a transmission greater than 70%, each measured using the color space CIE1931 (Illuminant C and a 2° observer), or according to ASTM D 1003 (2007) using illuminant C at a 0.125 inch (3.2 mm) thickness.

Excellent transparency can also be obtained when the polycarbonate composition comprises the first polycarbonate in an amount effective to provide at least 0.3 wt % of siloxane and the second polycarbonate in an amount effective to provide at least 5.0 wt % of bromine, each based on total weight of the first polycarbonate, second polycarbonate, and optional third polycarbonate, and the siloxane blocks have an average of 5 to 75, specifically 5 to 15 units. Effective amounts can be at least 10 wt %, at least 30 wt %, specifically 30 to 80 wt % of the first polycarbonate, and at least 20 wt %, specifically at least 20 to 50 wt % of the second polycarbonate (the TBBPA copolymer), and 0 to 50 wt % of the optional third polycarbonate, each based on the total weight of the first, second, and optionally third polycarbonates. An article molded from the composition has a haze less of less than 3% and a transmission greater than 85%, each measured using the color space CIE1931 (Illuminant C and a 2° observer) or according to ASTM D 1003 (2007) using illuminant C at a 0.062 inch (1.5 mm) thickness.

In still other embodiments, it has been found that limiting the amount of the optional third polymer, together with use of specific first and second polycarbonates can produce compositions with advantageous properties. In one such embodiment, the polycarbonate composition comprises the first polycarbonate (the poly(siloxane-carbonate)), the second polycarbonate (the TBBPA copolymer), and 8 to 12 wt % of the third polycarbonate, wherein the wt % of the first polycarbonate, second polycarbonate, and third polycarbonate sum to 100 wt % based on the total weight of the first, second and optionally third polycarbonates. The siloxane blocks have an average of 20 to 85 units. At least 0.4 wt % of siloxane and at least 7.8 wt % of bromine is present, each based on total weight of the first polycarbonate, second polycarbonate, and third polycarbonate. In an embodiment, the polycarbonate composition comprises 5 to 60 wt % of the first poly(siloxane-carbonate) 30 to 60 wt % of the second polycarbonate (the TBBPA copolymer).

In an alternative embodiment, it has been found that other brominated oligomers can be used in place of the TBBPA copolymer, such as other brominated polycarbonate oligomers or brominated epoxy oligomers. In this embodiment, the polycarbonate compositions contain the first poly(siloxane-carbonate), a brominated oligomer, and an optional additional polycarbonate different from the first polycarbonate and the brominated oligomer. The optional additional polycarbonate can be the same as the optional third polycarbonate described in the above embodiments. The first polycarbonate, the brominated oligomer, and the optional additional polycarbonate are present in amounts effective to provide at least 0.3 wt. %, or at least 0.4 wt % of siloxane and at least 7.8 wt % of bromine, each based on total weight of the first polycarbonate, brominated oligomer, and additional polycarbonate, and thus satisfy at least the smoke density test and the heat release OSU 65/65 test. In particular, the polycarbonate compositions comprise at least 5 wt %, specifically 5 to 85 wt %, or at least 10 wt %, specifically 10 to 70 wt %, or at least 15 wt %, specifically 15 to 60 wt %, of the first poly(siloxane-carbonate), at least 15 wt %, specifically at least 15 to 95 wt % of the brominated oligomer, and 0 to 60 wt % of the optional additional polycarbonate, each based on the total weight of the first polycarbonate, brominated oligomer, and optional additional polycarbonate. The siloxane blocks have an average of 5 to 100 units.

While the smoke density and OSU tests demonstrate the ability of the polycarbonate compositions described herein to comply with both the smoke generation and heat release requirements for transportation components, particularly aircraft or train interiors, any of the above-described compositions can advantageously comply with other related flammability and safety tests as described above.

The first, second, optional third, and optional additional polycarbonates, as well as the TBBPA copolymer and brominated polycarbonate oligomer have repeating structural carbonate units of formula (3):

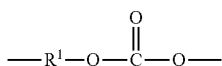
(3)

wherein at least 60%, specifically at least 80%, and specifically at least 90% of the total number of $R^1$ groups contains aromatic organic groups and the balance thereof are aliphatic or alicyclic groups. In particular, use of aliphatic groups is minimized in order to maintain the flammability performance of the polycarbonates. In an embodiment, at least 70%, at least 80%, or 95 to 100% of the $R^1$ groups are aromatic groups. In particular, each $R^1$ is a divalent aromatic group, for example derived from an aromatic dihydroxy compound of formula (4):

HO-$A^1$-$Y^1$-$A^2$-OH  (4)

wherein each of $A^1$ and $A^2$ is independently a monocyclic divalent arylene group, and $Y^1$ is a single bond or a bridging group having one or two atoms that separate $A^1$ from $A^2$. In an embodiment, one atom separates $A^1$ from $A^2$. In another embodiment, when each of $A^1$ and $A^2$ is phenylene, $Y^1$ is para to each of the hydroxyl groups on the phenylenes. Illustrative non-limiting examples of groups of this type are —O—, —S—, —S(O)—, —S(O)$_2$—, —C(O)—, methylene, cyclohexyl-methylene, 2-[2.2.1]-bicycloheptylidene, ethylidene, isopropylidene, neopentylidene, cyclohexylidene, cyclopentadecylidene, cyclododecylidene, and adamantylidene. The bridging group $Y^1$ can be a hydrocarbon group, specifically a saturated hydrocarbon group such as methylene, cyclohexylidene, or isopropylidene.

Included within the scope of formula (4) are bisphenol compounds of formula (5):

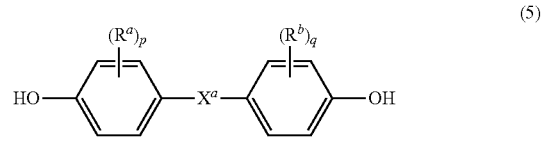
(5)

wherein each of $R^a$ and $R^b$ is independently a halogen atom or a monovalent hydrocarbon group; p and q are each independently integers of 0 to 4; and $X^a$ represents a single bond or one of the groups of formulas (6) or (7):

(6)

(7)

wherein each $R^c$ and $R^d$ is independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl, and $R^e$ is a divalent $C_{1-12}$ hydrocarbon group. In particular, $R^c$ and $R^d$ are each the same hydrogen or $C_{1-4}$ alkyl, specifically the same $C_{1-3}$ alkyl, even more specifically, methyl.

In an embodiment, $R^c$ and $R^d$ taken together is a $C_{3-20}$ cyclic alkylene or a heteroatom-containing $C_{3-20}$ cyclic alkylene comprising carbon atoms and heteroatoms with a valency of two or greater. These groups can be in the form of a single saturated or unsaturated ring, or a fused polycyclic ring system wherein the fused rings are saturated, unsaturated, or aromatic. A specific heteroatom-containing cyclic alkylene group comprises at least one heteroatom with a valency of 2 or greater, and at least two carbon atoms. Heteroatoms in the heteroatom-containing cyclic alkylene group include —O—, —S—, and —N(Z)—, where Z is a substituent selected from hydrogen, hydroxy, $C_{1-12}$ alkyl, $C_{1-12}$ alkoxy, or $C_{1-12}$ acyl.

In a specific embodiment, $X^a$ is a substituted $C_{3-18}$ cycloalkylidene of formula (8):

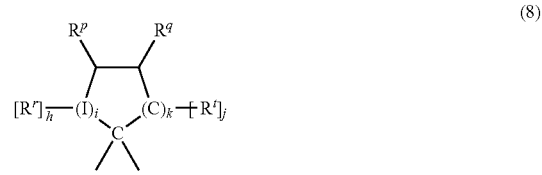
(8)

wherein each $R^r$, $R^p$, $R^q$, and $R^t$ is independently hydrogen, halogen, oxygen, or $C_{1-12}$ organic group; I is a direct bond, a carbon, or a divalent oxygen, sulfur, or —N(Z)— wherein Z is hydrogen, halogen, hydroxy, $C_{1-12}$ alkyl, $C_{1-12}$ alkoxy, or $C_{1-12}$ acyl; h is 0 to 2, j is 1 or 2, i is an integer of 0 or 1, and k is an integer of 0 to 3, with the proviso that at least two of $R^r$, $R^p$, $R^q$, and $R^t$ taken together are a fused cycloaliphatic, aromatic, or heteroaromatic ring. It will be understood that where the fused ring is aromatic, the ring as shown in formula (8) will have an unsaturated carbon-carbon linkage where the ring is fused. When k is 1 and i is 0, the ring as shown in formula (8) contains 4 carbon atoms, when k is 2, the ring as shown contains 5 carbon atoms, and when k is 3, the ring contains 6 carbon atoms. In an embodiment, two adjacent groups (e.g., $R^q$ and $R^t$ taken together) form an aromatic group, and in another embodiment, $R^q$ and $R^t$ taken together form one aromatic group and $R^r$ and $R^p$ taken together form a second aromatic group.

When k is 3 and i is 0, bisphenols containing substituted or unsubstituted cyclohexane units are used, for example bisphenols of formula (9):

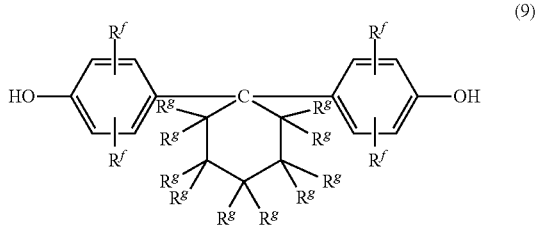

(9)

wherein $R^f$ is each independently hydrogen, $C_{1-12}$ alkyl, or halogen; and $R^g$ is each independently hydrogen or $C_{1-12}$ alkyl. The substituents can be aliphatic or aromatic, straight chain, cyclic, bicyclic, branched, saturated, or unsaturated. Such cyclohexane-containing bisphenols, for example the reaction product of two moles of a phenol with one mole of a hydrogenated isophorone, are useful for making polycarbonate polymers with high glass transition temperatures and high heat distortion temperatures. Cyclohexyl bisphenol-containing polycarbonates, or a combination comprising at least one of the foregoing with other bisphenol polycarbonates, are supplied by Bayer Co. under the APEC® trade name.

Other useful dihydroxy compounds having the formula HO—$R^1$—OH include aromatic dihydroxy compounds of formula (10):

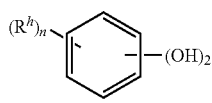

(10)

wherein $R^h$ is each independently a halogen atom, a $C_{1-10}$ hydrocarbyl such as a $C_{1-10}$ alkyl group, a halogen substituted $C_{1-10}$ hydrocarbyl such as a halogen-substituted $C_{1-10}$ alkyl group, and h is 0 to 4. The halogen is usually bromine.

Some illustrative examples of dihydroxy compounds include the following: 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl)phenylmethane, 2,2-bis(4-hydroxy-3-bromophenyl)propane, 1,1-bis(hydroxyphenyl)cyclopentane, 1,1-bis(4-hydroxyphenyl)cyclohexane, 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantine, alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9 to bis (4-hydroxyphenyl)fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, and the like; catechol; hydroquinone; and substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, and the like. Combinations comprising at least one of the foregoing dihydroxy compounds can be used.

Specific examples of bisphenol compounds that can be represented by formula (3) include 1,1-bis(4-hydroxyphenyl) methane, 1,1-bis(4-hydroxyphenyl)ethane, 2,2-bis(4-hydroxyphenyl)propane (bisphenol A or BPA), 2,2-bis(4-hydroxyphenyl)butane, 2,2-bis(4-hydroxyphenyl)octane, 1,1-bis(4-hydroxyphenyl)propane, 1,1-bis(4-hydroxyphenyl) n-butane, 2,2-bis(4-hydroxy-1-methylphenyl)propane, 1,1-bis(4-hydroxy-t-butylphenyl)propane, 3,3-bis(4-hydroxyphenyl)phthalimidine, 2-phenyl-3,3-bis(4-hydroxyphenyl) phthalimidine (PPPBP), and 1,1-bis(4-hydroxy-3-methylphenyl)cyclohexane (DMBPC). Combinations comprising at least one of the foregoing dihydroxy compounds can also be used.

"Polycarbonate" as used herein includes homopolycarbonates, copolymers comprising different $R^1$ moieties in the carbonate (referred to herein as "copolycarbonates"), and copolymers comprising carbonate units and other types of polymer units, such as siloxane units or ester units. In a specific embodiment, the polycarbonate is a linear homopolymer or copolymer comprising units derived from bisphenol A, in which each of $A^1$ and $A^2$ is p-phenylene and $Y^1$ is isopropylidene in formula (4). More specifically, at least 60%, particularly at least 80% of the $R^1$ groups in the polycarbonate homopolymer or copolymer are derived from bisphenol A.

The first polycarbonate is a copolymer comprising carbonate units of formula (3) and blocks of siloxane units, i.e., a poly(siloxane-co-carbonate), referred to herein as a "poly(siloxane-carbonate)." The polysiloxane contains blocks of units of formula (11):

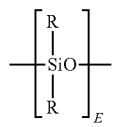
(11)

wherein R is each independently a $C_1$-$C_{30}$ hydrocarbon group, specifically a $C_{1-13}$ alkyl group, $C_{2-13}$ alkenyl group, $C_{3-6}$ cycloalkyl group, $C_{6-14}$ aryl group, $C_{7-13}$ arylalkyl group, or $C_{7-13}$ alkylaryl group. The foregoing groups can be fully or partially halogenated with fluorine, chlorine, bromine, or iodine, or a combination comprising at least one of the foregoing. Combinations of the foregoing R groups can be used in the same copolymer. In an embodiment, the polysiloxane comprises R groups that have minimum hydrocarbon content. In a specific embodiment, R is each the same and is a methyl group. In an embodiment, the siloxane blocks are atactic, isotactic, or syndiotactic. In an embodiment, the tacticity of the siloxane can affect the effective amount of each polycarbonate copolymer used.

The average value of E in formula (12) can vary as described in the individual embodiments above, from 5 to 200. In an embodiment, E has an average value of 5 to 100, 10 to 100, 10 to 50, 25 to 50, or 35 to 50. In another embodiment, E has an average value of 5 to 75, specifically 5 to 15, specifically 5 to 12, more specifically 7 to 12. The polysiloxane units can be In an embodiment, polydiorganosiloxane units are derived from polysiloxane bisphenols of formula (1):

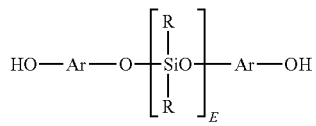
(1)

wherein E is as defined above; each R can be the same or different, and is as defined above; and each Ar can be the same or different, and is a substituted or unsubstituted $C_{6-30}$ arylene group, wherein the bonds are directly connected to an aromatic moiety. The Ar groups in formula (1) can be derived from a $C_{6-30}$ dihydroxy aromatic compound, for example a dihydroxy aromatic compound of formula (4), (5), (8), (9), or (10) above. Combinations comprising at least one of the foregoing dihydroxy aromatic compounds can also be used. Illustrative examples of dihydroxy aromatic compounds are resorcinol (i.e., 1,3-dihydroxybenzene), 4-methyl-1,3-dihydroxybenzene, 5-methyl-1,3-dihydroxybenzene, 4,6-dimethyl-1,3-dihydroxybenzene, 1,4-dihydroxybenzene, 1,1-bis(4-hydroxyphenyl)methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxyphenyl)cyclohexane, bis(4-hydroxyphenyl sulfide), and 1,1-bis(4-hydroxy-t-butylphenyl)propane. Combinations comprising at least one of the foregoing dihydroxy compounds can also be used. In an embodiment, the dihydroxy aromatic compound is unsubstituted, or is not substituted with non-aromatic hydrocarbon-containing substituents such as alkyl, alkoxy, or alkylene substituents.

In a specific embodiment, where Ar is derived from resorcinol, the polydiorganosiloxane repeating units are derived from polysiloxane bisphenols of formula (12):

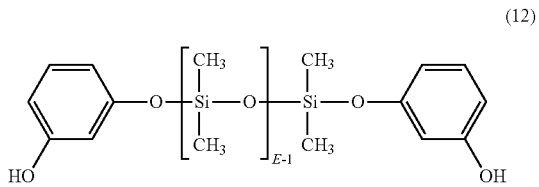
(12)

or, where Ar is derived from bisphenol-A, from polysiloxane bisphenols of formula (13):

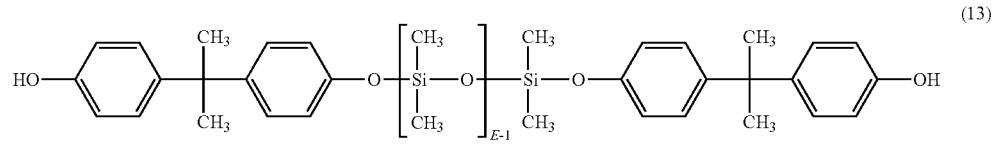
(13)

wherein E is as defined above.

In another embodiment, polydiorganosiloxane units are derived from polysiloxane bisphenols of formula (2):

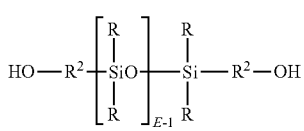
(2)

wherein R and E are as described above, and each $R^2$ is independently a divalent $C_{1-30}$ alkylene or $C_{7-30}$ arylene-alkylene, and wherein the polymerized polysiloxane unit is the reaction residue of its corresponding dihydroxy aromatic compound. In a specific embodiment, where $R^2$ is $C_{7-30}$ arylene-alkylene, the polydiorganosiloxane units are derived from polysiloxane bisphenols of formula (14):

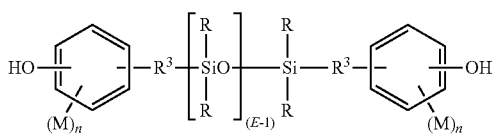
(14)

wherein R and E are as defined above. $R^3$ is each independently a divalent $C_{2-8}$ aliphatic group. Each M can be the same or different, and can be a halogen, cyano, nitro, $C_{1-8}$ alkylthio, $C_{1-8}$ alkyl, $C_{1-8}$ alkoxy, $C_{2-8}$ alkenyl, $C_{2-8}$ alkenyloxy group, $C_{3-8}$ cycloalkyl, $C_{3-8}$ cycloalkoxy, $C_{6-10}$ aryl, $C_{6-10}$ aryloxy, $C_{7-12}$ arylalkyl, $C_{7-12}$ arylalkoxy, $C_{7-12}$ alkylaryl, or $C_{7-12}$ alkylaryloxy, wherein each n is independently 0, 1, 2, 3, or 4.

In an embodiment, M is bromo or chloro, an alkyl such as methyl, ethyl, or propyl, an alkoxy such as methoxy, ethoxy, or propoxy, or an aryl such as phenyl, chlorophenyl, or tolyl; $R^3$ is a dimethylene, trimethylene or tetramethylene group; and R is a $C_{1-8}$ alkyl, haloalkyl such as trifluoropropyl, cyanoalkyl, or aryl such as phenyl, chlorophenyl or tolyl. In another embodiment, R is methyl, or a combination of methyl and trifluoropropyl, or a combination of methyl and phenyl. In still another embodiment, M is methoxy, n is 0 or 1, $R^3$ is a divalent $C_{1-3}$ aliphatic group, and R is methyl.

In a specific embodiment, the polydiorganosiloxane units are derived from a polysiloxane bisphenol of formula (15):

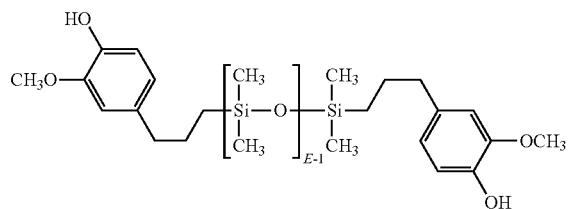

(15)

wherein E is as described above.

In another specific embodiment, the polydiorganosiloxane units are derived from polysiloxane bisphenol of formula (16):

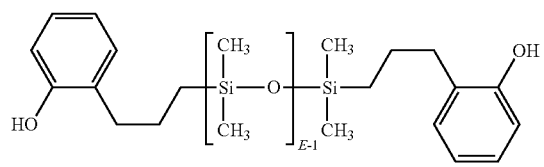

(16)

wherein E is as defined above.

Dihydroxy polysiloxanes can be made by functionalizing a substituted siloxane oligomer of formula (17):

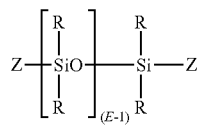

(17)

wherein R and E are as defined in formula (11), and Z is H, halogen (Cl, Br, or I), or carboxylate, such as acetate, formate, benzoate, and the like. In an embodiment where Z is H, compounds of formula (20) can be prepared by platinum catalyzed addition with an aliphatically unsaturated monohydric phenol. Suitable aliphatically unsaturated monohydric phenols included, for example, eugenol, 2-allylphenol, 4-allylphenol, 4-allyl-2-methylphenol, 4-allyl-2-phenylphenol, 4-allyl-2-bromophenol, 4-allyl-2-t-butoxyphenol, 4-phenyl-2-allylphenol, 2-methyl-4-propenylphenol, 2-allyl-4,6-dimethylphenol, 2-allyl-4-bromo-6-methylphenol, 2-allyl-6-methoxy-4-methylphenol, and 2-allyl-4,6-dimethylphenol. Combinations comprising at least one of the foregoing can also be used. Where Z is halogen or carboxylate, functionalization can be accomplished by reaction with a dihydroxy aromatic compound of formulas (4), (5), (6), (7), (8), (9), and (10), or a combination comprising at least one of the foregoing dihydroxy aromatic compounds. In an embodiment, compounds of formula (13) can be formed from an alpha, omega-bisacetoxypolydiorganosiloxane and a dihydroxy aromatic compound under phase transfer conditions.

The relative amount of carbonate and siloxane units in the poly(siloxane-carbonate) will depend on the desired properties, and are carefully selected using the guidelines provided herein. In particular, as mentioned above, the poly(siloxane-carbonate) is selected to have a certain average value of E, and is selected and used in amount effective to provide the desired wt % of siloxane units in the composition. In an embodiment, the poly(siloxane-carbonate) can comprise siloxane units in an amount of 0.3 to 30 weight percent (wt %), specifically 0.5 to 25 wt %, or 0.5 to 15 wt %, or even more specifically 0.7 to 8 wt %, or 0.7 to 7 wt %, based on the total weight of the poly(siloxane-carbonate), with remainder being carbonate units, and with the proviso that the siloxane units are provided by polysiloxane units covalently bonded in the polymer backbone of the polycarbonate-polysiloxane copolymer.

In an embodiment, the poly(siloxane-carbonate) comprises units derived from polysiloxane bisphenols (14) as described above, specifically wherein M is methoxy, n is 0 or 1, $R^3$ is a divalent $C_{1-3}$ aliphatic group, and R is methyl, still more specifically a polysiloxane bisphenol of formula (15) or (16). In these embodiments, E can have an average value of 8 to 100, wherein the siloxane units are present in an amount of 0.3 to 25 wt % based on the total weight of the poly(siloxane-carbonate); or, in other embodiments, E can have an average value of 25 to 100, wherein the siloxane units are present in an amount of 5 to 30 wt % based on the total weight of the poly(siloxane-carbonate); or E can have an average value of 30 to 50, or 40 to 50, wherein the siloxane units are present in an amount of 4 to 8 wt % based on the total weight of the poly(siloxane-carbonate); or E can have an average value of 5 to 12, wherein the siloxane units are present in an amount of 0.5 to 7 wt % based on the total weight of the poly(siloxane-carbonate).

1. In some embodiments a combination of two or more different poly(siloxane) copolymers, in particular two or more different poly(siloxane-carbonate)s are used to obtain the desired properties. The poly(siloxane) copolymers can differ in one or more of a property (e.g., polydispersity or molecular weight) or a structural feature (e.g., the value of E, or the number of blocks of E. The additional polymer need not be a poly(siloxane-carbonate), but can be a copolymer having (a) a first repeating unit, and (b) a poly(siloxane) block unit having the formula:

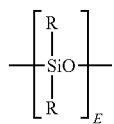

wherein R is each independently a $C_1$-$C_{30}$ hydrocarbon group, and E has an average value of 5 to 200, wherein the first repeating unit is, for example an imide, a etherimide, an ester, a arylene ether, an arylene ether ketone, an arylene ether sulfone, an arylene ether ketone, and the like. For example, a poly(siloxane-carbonate) having a relatively lower weight percent (e.g., 3 to 10 wt %, or 6 wt %) of relatively longer length (E having an average value of 30-60) can provide a composition of lower colorability, whereas a poly(siloxane-carbonate) having a relatively higher weight percent of siloxane units (e.g., 15 to 25 wt %, or 20 wt %) of the same length siloxane units, can provide better impact properties. Use of a combination of these two poly(siloxane-carbonate)s can provide a composition having both good colorability and impact properties. Similarly, a poly(siloxane-carbonate) can be used with a poly(siloxane-etherimide) to improve impact.

The first polycarbonate, i.e., the poly(siloxane-carbonate is used with a second, brominated polycarbonate or a brominated oligomer. The second polycarbonate is a specific brominated polycarbonate, i.e., a polycarbonate containing brominated carbonate units derived from 2,2',6,6'-tetrabromo-4,4'-isopropylidenediphenol (TBBPA) and carbonate units derived from at least one dihydroxy aromatic compound that is not TBBPA. The dihydroxy aromatic compound can be one of formula (5), (6), (7), (8), (9), or (10). In a specific embodiment the dihydroxy aromatic compound is of formula (5), more specifically dihydroxy aromatic compound (5) containing no additional halogen atoms. In an embodiment, the dihydroxy aromatic compound is Bisphenol-A.

The relative ratio of TBBPA to the dihydroxy aromatic compound used to manufacture the TBBPA copolymer will depend in some embodiments on the amount of the TBBPA copolymer used and the amount of bromine desired in the polycarbonate composition. In an embodiment, the TBBPA copolymer is manufactured from a composition having 30 to 70 wt % of TBBPA and 30 to 70 wt % of the dihydroxy aromatic compound, specifically Bisphenol-A, or specifically 45 to 55 wt % of TBBPA and 45 to 55 wt % of the dihydroxy aromatic compound, specifically bisphenol-A. In an embodiment, no other monomers are present in the TBBPA copolymer.

Combinations of different TBBPA copolymers can be used. Specifically, a TBBPA copolymer can be used having phenol endcaps. Also specifically, a TBBPA carbonate can be used having 2,4,6-tribromophenol endcaps can be used.

The TBBPA copolymers can have an Mw from 18,000 to 30,000 Daltons, specifically 20,000 to 30,000 Daltons as measured by gel permeation chromatography (GPC) using polycarbonate standards.

Alternatively, the first poly(siloxane-carbonate) is used with a brominated oligomer. Thus, instead of a TBBPA copolymer as the second polycarbonate, a brominated oligomer having an Mw of 18,000 Daltons or less is used. The term "brominated oligomer" is used herein for convenience to identify a brominated compound comprising at least two repeat units with bromine substitution, and having an Mw of less than 18,000 Daltons. The brominated oligomer can have an Mw of 1000 to 18,000 Daltons, specifically 2,000 to 15,000 Daltons, and more specifically 3,000 to 12,000 Daltons.

In certain embodiments, the brominated oligomer has a bromine content of 40 to 60 wt %, specifically 45 to 55 wt %, more specifically 50 to 55 wt %. The specific brominated oligomer and the amount of brominated oligomer are selected to provide at least 7.8 wt % bromine, specifically 7.8 to 14 wt % bromine, more specifically 8 to 12 wt % bromine, each based on the total weight of first polycarbonate, the brominated oligomer, and the optional additional polycarbonate.

The brominated oligomer can be a brominated polycarbonate oligomer derived from brominated aromatic dihydroxy compounds (e.g., brominated compounds of formula (3)) and a carbonate precursor, or from a combination of brominated and non-brominated aromatic dihydroxy compounds, e.g., of formula (3), and a carbonate precursor. Brominated polycarbonate oligomers are disclosed, for example, in U.S. Pat. No. 4,923,933, U.S. Pat. No. 4,170,711, and U.S. Pat. No. 3,929,908. Examples of brominated aromatic dihydroxy compounds include 2,2-bis(3,5-dibromo-4-hydroxyphenyl)propane, bis(3,5-dibromo-4-hydroxyphenyl)menthanone, and 2,2',6,6'-tetramethyl-3,3',5,5'-tetrabromo-4,4'-biphenol.

Examples of non-brominated aromatic dihydroxy compounds for copolymerization with the brominated aromatic dihydroxy compounds include Bisphenol-A, bis(4-hydroxyphenyl)methane, 2,2-bis(4-hydroxy-3-methylphenyl)propane, 4,4-bis(4-hydroxyphenyl)heptane, and (3,3'-dichloro-4,4'-dihydroxydiphenyl)methane. Combinations of two or more different brominated and non-brominated aromatic dihydroxy compounds can be used. If a combination of aromatic dihydroxy compounds is used, then the combinations can contain 25 to 55 mole percent of the brominated aromatic dihydroxy compounds and 75 to 65 mole percent of a non-brominated dihydric phenol. Branched brominated polycarbonate oligomers can also be used, as can compositions of a linear brominated polycarbonate oligomer and a branched brominated polycarbonate oligomer. Combinations of different brominated copolycarbonate oligomers can be used. Various endcaps can be present, for example polycarbonates having phenol endcaps or 2,4,6-tribromophenol endcaps can be used.

Other types of brominated oligomers can be used, for example brominated epoxy oligomers. Examples of brominated epoxy oligomers include those derived from Bisphenol-A, hydrogenated Bisphenol-A, Bisphenol-F, Bisphenol-S, novolak epoxies, phenol novolac epoxies, cresol novolac epoxies, N-glycidyl epoxies, glyoxal epoxies dicyclopentadiene phenolic epoxies, silicone-modified epoxies, and epsilon-caprolactone modified epoxies. Combinations of different brominated epoxy oligomers can be used. Specifically, a tetrabromobisphenol-A epoxy be used, having 2,4,6-tribromophenol endcaps. An epoxy equivalent weight of 200 to 3000 can be used.

In the polycarbonate compositions comprising the first polycarbonate (the poly(siloxane-carbonate)) and the second, brominated polycarbonate (the TBBPA copolymer), an optional third polycarbonate can be present that is not same as the first poly(siloxane-carbonate) or the second TBBPA copolymer). Specifically, the third polycarbonate does not contain siloxane units or bromine. In the alternative embodiments of the polycarbonate compositions comprising the first polycarbonate (the poly(siloxane-carbonate)) and a brominated oligomer, an additional polycarbonate that is not the same as the first poly(siloxane-carbonate) or the brominated oligomer is present. Specifically, the additional polycarbonate does not contain siloxane units or bromine.

In some embodiments a combination of two or more different brominated polymers are used to obtain the desired properties. The brominated polymers can differ in one or more of a property (e.g., polydispersity or molecular weight) or a structural feature (e.g., the identity of the repeating units, the presence of copolymer units, or the amount of bromine in the polymer). For example, two different TBBPA copolymers can be used, or a combination of a TBBPA copolymer and a brominated epoxy oligomer. Of course, two or more different poly(siloxane) copolymers can be used with two or more different brominated polymers.

The optional third polycarbonate and the additional polycarbonate comprise units of formula (3) as described above, specifically wherein $R^1$ is derived from the dihydroxy aromatic compound (5) (6), (7), (8), (9), or (10), or a combination thereof, and more the specifically dihydroxy aromatic compound (5) containing no additional halogen atoms. In an embodiment, at least 60%, at least 80%, or at least 90% of the $R^1$ units are Bisphenol-A units. In an embodiment, the optional third polycarbonate is a homopolymer with Bisphenol-A carbonate units. In another embodiment, the additional polycarbonate is a homopolymer with Bisphenol-A carbonate units.

It is also possible for the optional third polycarbonate or the additional polycarbonate to contain units other than polycarbonate units, for example ester units. Polycarbonate copolymers with ester units, known as poly(ester-carbonate)s and polyester-polycarbonates are selected so as to not significantly adversely affect the desired properties of the polycarbonate composition, in particular low smoke density and low heat release, as well as other properties such as stability to UV light. For example, aromatic ester units can diminish color stability of the polycarbonate composition during processing and when exposed to UV light. Aromatic ester units can also decrease the melt flow of the polycarbonate composition. On the other hand, the presence of aliphatic ester units can diminish the heat release values.

When used, poly(ester-carbonate)s further contain, in addition to recurring carbonate chain units of formula (3), repeating units of formula (17):

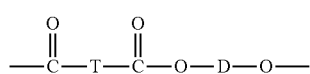
(17)

wherein D is a divalent group derived from a dihydroxy compound, and can be, for example, a $C_{2-10}$ alkylene group, a $C_{6-20}$ alicyclic group, a $C_{6-20}$ aryl, or a polyoxyalkylene group in which the alkylene groups contain 2 to 6 carbon atoms, specifically 2, 3, or 4 carbon atoms. In an embodiment, D is a $C_{2-30}$ alkylene having a straight chain, branched chain, or cyclic (including polycyclic) formula. In another embodiment, D is derived from an aromatic dihydroxy compound of formula (5) above. In another embodiment, D is derived from an aromatic dihydroxy compound of formula (10) above. T in formula (17) is a divalent group derived from a dicarboxylic acid, and can be, for example, a $C_{2-10}$ alkylene group, a $C_{6-20}$ alicyclic group, a $C_{6-20}$ alkyl aromatic group, or a $C_{6-20}$ aromatic group. Examples of aromatic dicarboxylic acids that can be used to prepare the polyester units include isophthalic or terephthalic acid, 1,2-di(p-carboxyphenyl)ethane, 4,4'-dicarboxydiphenyl ether, 4,4'-bisbenzoic acid, and combinations comprising at least one of the foregoing acids. Acids containing fused rings can also be present, such as in 1,4-, 1,5-, or 2,6-naphthalenedicarboxylic acids. Specific dicarboxylic acids are terephthalic acid, isophthalic acid, naphthalene dicarboxylic acid, cyclohexane dicarboxylic acid, or combinations comprising at least one of the foregoing. A specific dicarboxylic acid comprises a combination of isophthalic acid and terephthalic acid wherein the weight ratio of isophthalic acid to terephthalic acid is 100:0 to 0:100, or 99:1 to 1:99, or 91:9 to 2:98.

In another specific embodiment, D is a $C_{2-6}$ alkylene and T is p-phenylene, m-phenylene, naphthalene, a divalent cycloaliphatic group, or a combination comprising at least one of the foregoing. Alternatively, the polyester unit of the polyester-polycarbonate can be derived from the reaction of resorcinol with a combination of isophthalic and terephthalic diacids (or derivatives thereof). In another specific embodiment, the polyester unit is derived from the reaction of Bisphenol-A with a combination of isophthalic acid and terephthalic acid. In any of the foregoing embodiments, the polycarbonate units of the poly(ester-carbonate) are derived from a combination of resorcinol and bisphenol A in a molar ratio of resorcinol carbonate units to bisphenol A carbonate units of 1:99 to 99:1, specifically 20:80 to 80:20. The molar ratio of ester units to carbonate units in the copolymers can vary broadly, for example 1:99 to 99:1, specifically 10:90 to 90:10, more specifically 25:75 to 75:25, depending on the desired properties of the final composition.

The first polycarbonates, optional third polycarbonates, and additional polycarbonates can have an Mw of 5,000 to 200,000, specifically 10,000 to 100,000 grams per mole (g/mol), even more specifically 15,000 to 60,000 g/mol, still more specifically 16,000 to 45,000 g/mol, as measured by gel permeation chromatography (GPC), using a crosslinked styrene-divinylbenzene column and calibrated to polycarbonate references. GPC samples are prepared at a concentration of 1 mg/ml, and are eluted at a flow rate of 1.5 ml/min.

Melt volume flow rate (often abbreviated "MVR") measures the rate of extrusion of a thermoplastic through an orifice at a prescribed temperature and load. The polycarbonates can have an MVR, measured at 300° C. under a load of 1.2 kg, of 0.1 to 200 cubic centimeters per 10 minutes ($cm^3$/10 min), specifically 1 to 100 $cm^3$/10 min.

The first polycarbonates, optional third polycarbonates, and additional polycarbonates can be manufactured by interfacial polymerization or melt polymerization processes. Although the reaction conditions for interfacial polymerization can vary, a process generally involves dissolving or dispersing an aromatic dihydroxy reactant in aqueous caustic soda or potash, adding the resulting mixture to a water-immiscible solvent medium, and contacting the reactants with a carbonate precursor in the presence of a catalyst such as, for example, triethylamine or a phase transfer catalyst, under controlled pH conditions, e.g., 8 to 11. The most commonly used water immiscible solvents include methylene chloride, 1,2-dichloroethane, chlorobenzene, toluene, and the like.

Carbonate precursors include, for example, a carbonyl halide such as carbonyl bromide or carbonyl chloride, or a haloformate such as a bishaloformates of a dihydric phenol (e.g., the bischloroformates of bisphenol A, hydroquinone, or the like) or a glycol (e.g., the bishaloformate of ethylene glycol, neopentyl glycol, polyethylene glycol, or the like). Combinations comprising at least one of the foregoing types of carbonate precursors can also be used. In an embodiment, an interfacial polymerization reaction to form carbonate linkages uses phosgene as a carbonate precursor, and is referred to as a phosgenation reaction.

Among the phase transfer catalysts that can be used are catalysts of the formula $(R^3)_4Q^+X$, wherein each $R^3$ is the same or different, and is a $C_{1-10}$ alkyl group; Q is a nitrogen or phosphorus atom; and X is a halogen atom or a $C_{1-8}$ alkoxy or $C_{6-18}$ aryloxy group. phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is $Cl^-$, $Br^-$, a $C_{1-8}$ alkoxy group, or a $C_{6-18}$ aryloxy group. An effective amount of a phase transfer catalyst can be 0.1 to 10 wt % based on the weight of bisphenol in the phosgenation mixture. In another embodiment, an effective amount of phase transfer catalyst can be 0.5 to 2 wt % based on the weight of bisphenol in the phosgenation mixture.

Alternatively, melt polymerization processes can be used to make the polycarbonates. Generally, in the melt polymerization process, polycarbonates can be prepared by co-reacting, in a molten state, the dihydroxy reactant(s) and a diaryl carbonate ester, such as diphenyl carbonate, in the presence of a transesterification catalyst in a BANBURY® mixer, twin screw extruder, or the like to form a uniform dispersion. Volatile monohydric phenol is removed from the molten reactants by distillation and the polymer is isolated as a molten residue. A specifically useful melt process for making polycarbonates uses a diaryl carbonate ester having electron-withdrawing substituents on the aryls. Examples of diaryl carbonate esters with electron withdrawing substituents include bis(4-nitrophenyl)carbonate, bis(2-chlorophenyl)carbonate, bis(4-chlorophenyl)carbonate, bis(methyl salicyl)carbonate, bis(4-methylcarboxylphenyl)carbonate, bis(2-acetylphenyl) carboxylate, bis(4-acetylphenyl) carboxylate, or a combination comprising at least one of the foregoing. In addition, useful transesterification catalyst for use can include phase transfer catalysts of formula $(R^3)_4Q^+X$ above, wherein each $R^3$, Q, and X are as defined above. Transesterification catalysts include tetrabutylammonium hydroxide, methyltributylammonium hydroxide, tetrabutylammonium acetate, tetrabutylphosphonium hydroxide, tetrabutylphosphonium acetate, tetrabutylphosphonium phenolate, or a combination comprising at least one of the foregoing.

Branched polycarbonate blocks can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane (THPE), isatin-bis-phenol, tris-phenol TC (1,3,5-tris((p-hydroxyphenyl)isopropyl)benzene), tris-phenol PA (4(4(1,1-bis(p-hydroxyphenyl)-ethyl)alpha, alpha-dimethyl benzyl)phenol), 4-chloroformyl phthalic anhydride, trimesic acid, and benzophenone tetracarboxylic acid. The branching agents can be added at a level of 0.05 to 2.0 wt %. Mixtures comprising linear polycarbonates and branched polycarbonates can be used.

Endcapping agents can be added to the polymerization reaction, provided that such agents do not adversely affect the desired properties of the compositions significantly, in particular low smoke density and low heat release, as well as properties such as transparency, ductility, flame retardance, and the like. Examples of endcapping agents included a cyanophenol, specifically p-cyanophenol, and other monophenolic compounds, mono-carboxylic acid chlorides, and/or mono-chloroformates. Mono-phenolic chain stoppers are exemplified by monocyclic phenols such as phenol and $C_1$-$C_{22}$ alkyl-substituted phenols such as p-cumyl-phenol, resorcinol monobenzoate, and p- and tertiary-butyl phenol; and monoethers of diphenols, such as p-methoxyphenol. Alkyl-substituted phenols with branched chain alkyl substituents having 8 to 9 carbon atoms can be specifically mentioned. Certain mono-phenolic UV absorbers can also be used as a capping agent, for example 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5-triazines and their derivatives, and the like. Mono-carboxylic acid chlorides can also be used with cyanophenols as chain stopping agents. These include monocyclic, mono-carboxylic acid chlorides such as benzoyl chloride, $C_1$-$C_{22}$ alkyl-substituted benzoyl chloride, toluoyl chloride, halogen-substituted benzoyl chloride, bromobenzoyl chloride, cinnamoyl chloride, 4-nadimidobenzoyl chloride, and combinations comprising at least one of the foregoing; polycyclic, mono-carboxylic acid chlorides such as trimellitic anhydride chloride, and naphthoyl chloride; and combinations of monocyclic and polycyclic mono-carboxylic acid chlorides. Chlorides of aliphatic monocarboxylic acids with less than or equal to 22 carbon atoms are useful. Functionalized chlorides of aliphatic monocarboxylic acids, such as acryloyl chloride and methacryoyl chloride, are also useful. Also useful are mono-chloroformates including monocyclic, mono-chloroformates, such as phenyl chloroformate, alkyl-substituted phenyl chloroformate, p-cumyl phenyl chloroformate, toluene chloroformate, and combinations comprising at least one of the foregoing.

In addition to the polycarbonates and TBBPA copolymer or brominated oligomer, the polycarbonate compositions can include various additives ordinarily incorporated into flame retardant compositions of this type, with the proviso that the additive(s) are selected so as to not adversely affect the desired properties of the thermoplastic composition significantly, in particular low heat release and low smoke density. Such additives can be mixed at a suitable time during the mixing of the components for forming the composition. Exemplary additives include fillers, reinforcing agents, antioxidants, heat stabilizers, light stabilizers, ultraviolet (UV) light stabilizers, plasticizers, lubricants, mold release agents, antistatic agents, colorants such as such as titanium dioxide, carbon black, and organic dyes, surface effect additives, radiation stabilizers, additional flame retardants, and anti-drip agents. A combination of additives can be used. In general, the additives are used in the amounts generally known to be effective. The total amount of additives (other than any filler or reinforcing agents) is generally 0.01 to 25 parts per parts per hundred parts by weight of the combination of the first polymer, second TBBPA copolymer, and optional one or more third polymers, or the combination of the first polymer, the brominated oligomer, and the additional polycarbonate (PHR).

In an advantageous embodiment, it has been found that certain important additives can be used without adversely affecting the heat release and low smoke properties of the polycarbonate compositions significantly, in particular UV stabilizers, heat stabilizers (including phosphites), other flame retardants (such as Rimar salts) and certain pigments. The use of pigments such as titanium dioxide produces white compositions, which are commercially desirable. Pigments such as titanium dioxide (or other mineral fillers) can be present in the polycarbonate compositions in amounts of 0 to 12 PHR, 0.1 to 9 PHR, 0.5 to 5 PHR, or 0.5 to 3 PHR, each based on the total weight of the first polycarbonate, second TBBPA copolymer, and optional third polycarbonate, or based on the total weight of the first polycarbonate, the brominated oligomer, and the additional polycarbonate.

Exemplary antioxidant additives include organophosphites such as tris(nonyl phenyl)phosphite, tris(2,4-di-t-butylphenyl)phosphite, bis(2,4-di-t-butylphenyl)pentaerythritol diphosphite, distearyl pentaerythritol diphosphite; alkylated monophenols or polyphenols; alkylated reaction products of polyphenols with dienes, such as tetrakis[methylene(3,5-di-tert-butyl-4-hydroxyhydrocinnamate)]methane; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-

(3,5-di-tert-butyl-4-hydroxyphenyl)propionate, pentaerythrityl-tetrakis[3-(3,5-di-tert-butyl-4-hydroxyphenyl) propionate; amides of beta-(3,5-di-tert-butyl-4-hydroxyphenyl)-propionic acid, or combinations comprising at least one of the foregoing antioxidants. Antioxidants are used in amounts of 0.01 to 0.1 parts by weight, based on 100 parts by weight of the total composition, excluding any filler.

Exemplary heat stabilizer additives include organophosphites such as triphenyl phosphite, tris-(2,6-dimethylphenyl) phosphite, tris-(mixed mono- and di-nonylphenyl)phosphite; phosphonates such as dimethylbenzene phosphonate, phosphates such as trimethyl phosphate, or combinations comprising at least one of the foregoing heat stabilizers. Heat stabilizers are used in amounts of 0.01 to 0.1 PHR.

Light stabilizers and/or ultraviolet light (UV) absorbing additives can also be used. Exemplary light stabilizer additives include benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone, or combinations comprising at least one of the foregoing light stabilizers. Light stabilizers are used in amounts of 0.01 to 5 PHR.

Exemplary UV absorbing additives include hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB® 5411); 2-hydroxy-4-n-octyloxybenzophenone (CYASORB® 531); 2-[4,6-bis(2,4-dimethylphenyl)-1,3,5-triazin-2-yl]-5-(octyloxy)-phenol (CYASORB® 1164); 2,2'-(1,4-phenylene)bis(4H-3,1-benzoxazin-4-one) (CYASORB® UV-3638); 1,3-bis[(2-cyano-3,3-diphenylacryloyl) oxy]-2,2-bis[[(2-cyano-3,3-diphenylacryloyl)oxy]methyl] propane (UVINUL® 3030); 2,2'-(1,4-phenylene)bis(4H-3,1-benzoxazin-4-one); 1,3-bis[(2-cyano-3,3-diphenylacryloyl) oxy]-2,2-bis[[(2-cyano-3,3-diphenylacryloyl)oxy]methyl] propane; nano-size inorganic materials such as titanium oxide, cerium oxide, and zinc oxide, all with particle size less than or equal to 100 nanometers, or combinations comprising at least one of the foregoing UV absorbers. UV absorbers are used in amounts of 0.01 to 5 PHR.

Plasticizers, lubricants, and/or mold release agents can also be used. There is considerable overlap among these types of materials, which include phthalic acid esters such as dioctyl-4,5-epoxy-hexahydrophthalate; tris-(octoxycarbonylethyl) isocyanurate; tristearin; di- or polyfunctional aromatic phosphates such as resorcinol tetraphenyl diphosphate (RDP), the bis(diphenyl)phosphate of hydroquinone and the bis(diphenyl)phosphate of bisphenol A; poly-alpha-olefins; epoxidized soybean oil; silicones, including silicone oils; esters, for example, fatty acid esters such as alkyl stearyl esters, e.g., methyl stearate, stearyl stearate, pentaerythritol tetrastearate, and the like; combinations of methyl stearate and hydrophilic and hydrophobic nonionic surfactants comprising polyethylene glycol polymers, polypropylene glycol polymers, poly (ethylene glycol-co-propylene glycol)copolymers, or a combination comprising at least one of the foregoing glycol polymers, e.g., methyl stearate and polyethylene-polypropylene glycol copolymer in a solvent; waxes such as beeswax, montan wax, and paraffin wax. Such materials are used in amounts of 0.1 to 1 PHR.

Additional monomeric flame retardants include organic compounds that include phosphorus, bromine, and/or chlorine. Non-brominated and non-chlorinated phosphorus-containing flame retardants can be added for certain applications, for example organic compounds containing phosphorus-nitrogen bonds.

Inorganic flame retardants can also be used, for example salts of $C_{1-16}$ alkyl sulfonate salts such as potassium perfluorobutane sulfonate (Rimar salt), potassium perfluorooctane sulfonate, tetraethylammonium perfluorohexane sulfonate, and potassium diphenylsulfone sulfonate; salts such as $Na_2CO_3$, $K_2CO_3$, $MgCO_3$, $CaCO_3$, and $BaCO_3$, or fluoro-anion complexes such as $Li_3AlF_6$, $BaSiF_6$, $KBF_4$, $K_3AlF_6$, $KAlF_4$, $K_2SiF_6$, and/or $Na_3AlF_6$. When present, inorganic flame retardant salts are present in amounts of 0.01 to 10 parts by weight, more specifically 0.02 to 1 PHR.

Anti-drip agents in most embodiments are not used in the polycarbonate compositions. Anti-drip agents include a fibril-forming or non-fibril forming fluoropolymer such as polytetrafluoroethylene (PTFE). The anti-drip agent can be encapsulated by a rigid copolymer, for example styrene-acrylonitrile copolymer (SAN). PTFE encapsulated in SAN is known as TSAN. Antidrip agents are substantially absent or completely absent from the polycarbonate compositions in some embodiments.

Methods for forming the polycarbonate composition can vary. In an embodiment, the polycarbonates and brominated oligomer (if used) are combined (e.g., blended) with any additives (e.g., a mold release agent) such as in a screw-type extruder. The polycarbonates, brominated oligomer, and any additives can be combined in any order, and in form, for example, powder, granular, filamentous, as a masterbatch, and the like. The composition can then be foamed, extruded into a sheet or optionally pelletized. Methods of foaming a thermoplastic composition using frothing or physical or chemical blowing agents are known and can be used. The pellets can be used for foaming, molding into articles, or they can be used in forming a sheet of the flame retardant polycarbonate composition. In some embodiments, the composition can be extruded (or co-extruded with a coating or other layer) in the form of a sheet and/or can be processed through calendaring rolls to form the desired sheet.

As discussed above, the polycarbonate compositions are formulated to meet strict flammability requirements. The compositions have an E662 smoke test $D_{max}$ value of less than 200 when tested at a thickness of 1.6 mm, and in some embodiments can further have a value of less than 150, less than 100, less than 80, or 70 to 72. The polycarbonate compositions can have an E662 smoke test $D_{max}$ value of 70 to 200, 70 to 150, 70 to 100, or 70 to 80.

The polycarbonate compositions can further have an OSU integrated 2 minute heat release test value of less than 65 kW-min/m$^2$ and a peak heat release rate of less than 65 kW/m$^2$ as measured using the method of FAR F25.4, in accordance with Federal Aviation Regulation FAR 25.853 (d). In some embodiments the polycarbonate compositions can have an OSU integrated 2 minute heat release test value of less than 55 kW-min/m$^2$ and a peak heat release rate of less than 55 kW/m$^2$ as measured using the method of FAR F25.4, in accordance with Federal Aviation Regulation FAR 25.853 (d).

The poly(siloxane) copolymer compositions, for example the poly(siloxane-etherimide)copolymer compositions, can further be formulated to have a hydrogen to carbon ratio of 0.81:1 to 0.88:1.

The polycarbonate compositions can further have excellent impact strength, particularly when the average value of E is higher, i.e., 25 to 200, 25 to 100, or 25 to 50. Such compositions often have higher siloxane levels, i.e., at least 2.0 wt %, specifically 2.0 to 8 wt %, 2.0 to 5 wt %, 2.0 to 4 wt %, or 2.0 to 3.5 wt %, each based on the total weight of the first polycarbonate, second poly(siloxane-carbonate), and optional third polycarbonate, or based on the total weight of the first polycarbonate, the brominated oligomer, and the optional additional polycarbonate. An article molded from the polycarbonate compositions can have a notched Izod impact of greater than 500 J/m as measured according to ASTM D 256-10 at a 0.125 inch (3.2 mm) thickness. In some embodiments the articles have 80% or 100% ductility.

In some applications, it can be desirable to have a transparent article. Haze values, as measured using the color space CIE1931 (Illuminant C and a 2° observer), or by ANSI/ASTM D1003 (2007), Procedure A, illuminant C, can be a useful determination of the optical properties of the transparent flame retardant polycarbonate sheet. The lower the haze levels, the better the transparency of the finished sheet. The polycarbonate compositions can be formulated such that an article molded from the composition has a haze less of than 15% and a transmission of greater than 75%, each measured using the color space CIE1931 (Illuminant C and a 2° observer) or according to ASTM D 1003 (2007) using illuminant C at a 0.125 inch (3.2 mm) thickness. In some embodiments, the polycarbonate compositions can be formulated such that an article molded from the composition has all three of a haze less of than 15% and a transmission of greater than 75%, each measured using the color space CIE1931 (Illuminant C and a 2° observer) or according to ASTM D 1003 (2007) using illuminant C at a 0.125 inch (3.2 mm) thickness, and a room temperature notched Izod impact of greater than 500 J/m as measured according to ASTM D 256-10 at a 0.125 inch (3.2 mm) thickness.

In an embodiment, haze levels for an article comprising the polycarbonate composition, when measured at a thickness of 1.5 millimeters (mm), can be less than 10%, specifically 0 to 10%, 0.5 to 10%, and more specifically 1 to 10%, and transparency can be 70% or greater, specifically 80% or greater, greater than or equal to 75%, more specifically, greater than or equal to 90%, as measured using the color space CIE1931 (Illuminant C and a 2° observer), or in accordance with ASTM D1003-07, Procedure A, illuminant C. These values can be obtained even when average value of E in the poly(siloxane-carbonate) is higher, i.e., 25 to 200, 25 to 100, or 25 to 50. Such compositions often have higher siloxane levels, i.e., at least 2.0 wt %, specifically 2.0 to 8 wt %, 2.0 to 5 wt %, 2.0 to 4 wt %, or 2.0 to 3.5 wt %, based on the total weight of the polymers (and oligomers, if present) in the polycarbonate compositions. The TBBPA copolymer can be present in an amount from 35 to 50 wt %, and the bromine can be present in an amount of at least 7.8 wt %, specifically 8 to 25 wt %, more specifically 8 to 13 wt %, or 10 to 13 wt %, each based on the total weight of the first polycarbonate, TBBPA copolymer, and optional third polycarbonate. The bromine-containing oligomer can be present in an amount from 15 to 30 wt %, and the bromine can be present in an amount greater than 8 wt %, specifically 8 to 25 wt %, more specifically 8 to 13 wt %, based on the total weight of the first polycarbonate, the brominated oligomer, and the additional.

In another embodiment, even greater transparency can be obtained when the first polycarbonate is a poly(siloxane-carbonate) copolymer having average value of E that is lower, i.e., 5 to 75, 5 to 50, or 5 to 15, specifically 7 to 13, or 8 to 12. Such compositions further have at least 30 wt %, specifically 30 to 80 wt %, or 30 to 60 wt % of the first polycarbonate, at least 20 wt %, specifically 20 to 70 wt %, or 20 to 65 wt % of the TBBPA copolymer, and 0 to 50 wt %, specifically 0 to 30 wt %, or 5 to 20 wt % of the optional third copolymer; lower siloxane levels, i.e., at least 0.3 wt %, specifically 0.3 to 2 wt %, 0.3 to 1 wt %, 0.3 to 0.8 wt %; and at least 5 wt %, specifically 5 to 20 wt % bromine, 5 to 10 wt %, or 7.8 to 13 wt % of bromine, each based on the total weight of the first polycarbonate, TBBPA copolymer, and optional third polycarbonate.

Density is a critical factor in aircraft components, and the polycarbonate compositions can be formulated to have lower densities, in particular a density of 1.31 g/cc or less, or 1.30 g/cc or less. Such densities can generally be obtained when the amount of bromine is less than 15 wt %, 13 wt %, 12 wt %, 11 wt %, 10 wt %, 9 wt %, 8 wt %, or 7.8 wt %, each based on the total weight of the first polycarbonate, second TBBPA copolymer, and optional third polycarbonate, or based on the total weight of the first polycarbonate, the brominated oligomer, and the additional polycarbonate of this embodiment.

The compositions can further have good melt viscosities, which aids processing. The polycarbonate compositions can have a melt volume flow rate (MVR, cubic centimeter per 10 minutes (cc/10 min), according to ASTM D 1238)) of less than 20, less than 19, less than 18, less than 17, less than 16, less than 15, or less than 12, measured at 300° C./1.2 Kg at 360 second dwell.

As mentioned throughout, the polycarbonate compositions can be used in a wide variety of applications, particularly those requiring low smoke and low heat release values. Articles comprising the polycarbonate applications can be manufactured by foaming, molding, thermoforming, extruding, or casting the polycarbonate compositions. The polycarbonate compositions can be used to form a foamed article, a molded article, a thermoformed article, an extruded film, an extruded sheet, one or more layers of a multi-layer article, a substrate for a coated article, or a substrate for a metallized article.

Illustrative articles include access panels, access doors, air flow regulators air gaspers, air grilles, arm rests, baggage storage doors, balcony components, cabinet walls, ceiling panels, door pulls, door handles, duct housing, enclosures for electronic devices, equipment housings, equipment panels, floor panels, food carts, food trays, galley surfaces, grilles, handles, housings for TVs and displays, light panels, magazine racks, telephone housings, partitions, parts for trolley carts, seat backs, seat components, railing components, seat housings, shelves, side walls, speaker housings, storage compartments, storage housings, toilet seats, tray tables, trays, trim panel, window moldings, window slides, windows, and the like. The polycarbonate compositions are particularly useful in train and aircraft, for example a variety of aircraft compartment interior applications, as well as interior applications for other modes of transportation, such as bus, train, subway, marine, and the like. The articles manufactured from the compositions described herein can thus be a component of an aircraft, train, marine, subway vehicle, or other transportation applications. In a specific embodiment the articles interior components for aircraft or trains, including access panels, access doors, air flow regulators baggage storage doors, display panels, display units, door handles, door pulls, enclosures for electronic devices, food carts, food trays, grilles, handles, magazine racks, seat components, partitions, refrigerator doors, seat backs, side walls, tray tables, trim panels, and the like. The polycarbonate compositions can be formed (e.g., molded) into sheets that can be used for any of the above mentioned components. It is generally noted that the overall size, shape, thickness, optical properties, and the like of the polycarbonate sheet can vary depending upon the desired application.

In some applications, it can be desirable to have a transparent flame retardant article, such as a sheet. With regard to the transparency of the polycarbonate sheet, end user specifications (e.g., commercial airline specifications) generally specify that the component satisfy a particular predetermined threshold. Haze values, as measured using the color space CIE1931 (Illuminant C and a 2° observer), or by ANSPASTM D1003-00, Procedure A, illuminant C, can be a useful determination of the optical properties of the transparent flame retardant polycarbonate articles such as a sheet. The lower the haze levels, the better the transparency of the finished article.

The transparent polycarbonate compositions have special utility in applications requiring clarity, for example any of the above articles or components can be manufactured using the transparent polycarbonate compositions disclosed herein. In an embodiment, the transparent polycarbonate compositions are used for the manufacture of balcony components, balusters for stairs and balconies, ceiling panels, covers for life vests, covers for storage bins, dust covers for windows, layers of an electrochromic device, lenses for televisions, electronic displays, gauges, or instrument panels, light covers, light diffusers, light tubes and light pipes, mirrors, partitions, railings, refrigerator doors, shower doors, sink bowls, trolley cart containers, trolley cart side panels, windows, or the like, particularly in aircraft, marine transports, or trains.

Any of the foregoing articles, but in particular the transparent articles, can further have a hardcoat disposed on a surface of the article to enhance abrasion and scratch resistance, chemical resistance, and the like. Hardcoats are known in the art, and include, for example, various polyacrylates such as hyperbranched polyacrylates, silicones, polyfluoroacrylates, urethane-acrylates, phenolics, perfluorpolyethers, and the like.

The disclosure is further illustrated by the following Examples. It should be understood that the non-limiting examples are merely given for the purpose of illustration. Unless otherwise indicated, all parts and percentages are by weight based upon the total weight of the polycarbonates, or the total weight of the polycarbonates and brominated oligomer in the polycarbonate compositions. The amount of additives is thus given in parts by weight per hundred parts by weight of the resins (PHR).

EXAMPLES

Materials

The descriptions of the polycarbonates and polycarbonate copolymers used in the Examples are described in Table 1. Methods for preparing the brominated polycarbonates and the poly(siloxane-carbonate) copolymers are described after Table 1.

In Table 1, a reference to D10, D30, or D45 means a dimethylsiloxane block having an average length of 10.5+/−2.5, with two additional terminal silicon group (with silicon hydride levels of less than 20 ppm, volatiles of less than 0.4%), 30+/−4 with two additional terminal silicon groups (with silicon hydride levels of less than 20 ppm, volatiles of less than 0.4%, and D3 and D4 levels of less than 10 and 1000 ppm respectively), or 45+/−5 with two additional terminal silicon groups (with silicon hydride levels of less than 20 ppm, volatiles of less than 0.4%, and D3 and D4 levels of less than 10 and 1000 ppm respectively.). The values of D and wt % siloxane for the copolymers in Table 1 were as charged to the reactor.

The weight average molecular weights (Mw) of the polymers and copolymers in Table 1 were measured by gel permeation chromatography using polycarbonate standards. The endcap was PCP (p-cumyl phenol) or phenol. The percent of siloxane and bromine is weight percent based on the weight of the copolymer.

TABLE 1

| Acronym | Description | Mw | PDI | Endcap | Wt % Siloxane | Avg. Siloxane Length | Wt % Br |
|---|---|---|---|---|---|---|---|
| TBBPA-BPA | TetrabromoBPA/BPA Copolymer | 23,660 | 2.6 | PCP | — | — | 26 |
| BC52 | Tetrabromo BPA Oligomer | 2,638 | 1.7 | Phenol | — | — | 52 |
| SiPC 1 | D10 siloxane block co-polycarbonate | 30,000 | — | PCP | 1 | 10 | — |
| SiPC 1B | D10 siloxane block co-polycarbonate | 22,200 | — | PCP | 1 | 10 | — |
| SiPC 2 | D10 siloxane block co-polycarbonate | 23,600 | 3.0 | PCP | 5 | 10 | — |
| SiPC 3 | D30 siloxane block co-polycarbonate | 23,472 | 2.2 | PCP | 6 | 30 | — |
| SiPC 4 | D45 siloxane block co-polycarbonate | 23,013 | 2.2 | PCP | 6 | 45 | — |
| SiPC 5 | D45 siloxane block co-polycarbonate | 29,852 | 2.6 | PCP | 20 | 45 | — |
| PC 1 | PCP Capped BPA Polycarbonate | 21,900 | 2.5 | PCP | — | — | — |
| PC 2 | PCP Capped BPA Polycarbonate | 29,830 | 2.5 | PCP | — | — | — |

TBBPA-BPA Copolymer.

A representative reaction description for a 26 wt % bromine copolycarbonate batch is as follows.

To the formulation tank was added dichloromethane (16 L), DI water (12 L), bisphenol-A (2250 g, 9.9 moles), tetrabromobisphenol-A (2250 g, 4.1 moles), p-cumylphenol (102 g, 0.48 mole), triethylamine (75 g, 0.74 mole) and sodium gluconate (10 g). The mixture was transferred to the batch reactor. The reactor agitator was started and circulation flow was set at 80 L/min. Phosgene flow to the reactor was initiated (80 g/min rate). A pH target of 10.0 was maintained throughout the batch by the addition of 33% aqueous sodium hydroxide. The total phosgene addition amount was 2500 g (25.3 moles). After the phosgene addition was complete, a sample from the reactor was obtained and verified to be substantially free of unreacted monomers and chloroformates. Mw of the reaction sample was determined by GPC (Mw=23660, PDI=2.6). The reactor was purged with nitrogen then the batch was transferred to the centrifuge feed tank. To the batch in the feed tank was added dilution dichloromethane (10 L) then the mixture was purified using a train of liquid-liquid centrifuges. Centrifuge one removed the brine phase. Centrifuge two removed the catalyst by extracting the polymer solution with aqueous hydrochloric acid (pH 1). Centrifuges three through eight substantially removed residual ions by extracting the polymer solution with DI water. A sample of the polymer solution was tested and verified less than 5 ppm each of ionic chloride and residual triethylamine.

The polymer solution was transferred to the precipitation feed tank. The polymer was isolated as a white powder by steam precipitation followed by drying in a cone shaped dryer using heated nitrogen (210° F.). Mw=23532. A pressed film of a sample of the polymer was transparent and tough.

SiPC 1 (1D10 Copolymer): A representative reaction description for a 1% siloxane D10 poly(siloxane-carbonate) is as follows. To the formulation tank was added dichloromethane (15 L), DI water (12 L), bisphenol-A (4410 g, 19.3 moles), D10 eugenol-capped siloxane (90 g, 0.07 moles), p-cumylphenol (174 g, 0.82 mole), triethylamine (30 g, 0.30 mole) and sodium gluconate (10 g). The mixture was transferred to the batch reactor. The reactor agitator was started and circulation flow was set at 80 L/min Phosgene flow to the reactor was initiated (80 g/min rate). A pH target of 10.0 was maintained throughout the batch by the addition of 33% aqueous sodium hydroxide. The total phosgene addition amount was 2300 g (23.3 moles). After the phosgene addition was complete, a sample from the reactor was obtained and verified to be substantially free of unreacted BPA and chloroformates. Mw of the reaction sample was determined by GPC (Mw=22370 Daltons, PDI=2.4). The reactor was purged with nitrogen then the batch was transferred to the centrifuge feed tank.

To the batch in the feed tank was added dilution dichloromethane (10 L) then the mixture was purified using a train of liquid-liquid centrifuges. Centrifuge one removed the brine phase. Centrifuge two removed the catalyst by extracting the polymer solution with aqueous hydrochloric acid (pH 1). Centrifuges three through eight substantially removed residual ions by extracting the polymer solution with DI water. A sample of the polymer solution was tested and verified less than 5 ppm each of ionic chloride and residual triethylamine.

The polymer solution was transferred to the precipitation feed tank. The polymer was isolated as a white powder by steam precipitation followed by drying in a cone shaped dryer using heated nitrogen (99° C. (210° F.)).

SiPC 2 (5D10 Copolymer).

A representative reaction description for a 5 wt % siloxane D10 poly(siloxane-carbonate) batch is as follows.

To the formulation tank was added dichloromethane (15 L), DI water (12 L), bisphenol-A (4125 g, 18.1 moles), D10 eugenol capped siloxane (375 g, 0.30 moles), p-cumylphenol (166 g, 0.78 mole), triethylamine (30 g, 0.30 mole) and sodium gluconate (10 g). The mixture was transferred to the batch reactor. The reactor agitator was started and circulation flow was set at 80 L/min. Phosgene flow to the reactor was initiated (80 g/min rate). A pH target of 10.0 was maintained throughout the batch by the addition of 33% aqueous sodium hydroxide. The total phosgene addition amount was 2300 g (23.3 moles). After the phosgene addition was complete, a sample of the reactor was obtained and verified to be substantially free of unreacted BPA and chloroformates. Mw of the reaction sample was determined by GPC (Mw=21991 Daltons, PDI=2.6). The reactor was purged with nitrogen then the batch was transferred to the centrifuge feed tank.

To the batch in the feed tank was added dilution dichloromethane (10 L) then the mixture was purified using a train of liquid-liquid centrifuges. Centrifuge one removed the brine phase. Centrifuge two removed the catalyst by extracting the polymer solution with aqueous hydrochloric acid (pH 1). Centrifuges three through eight substantially removed residual ions by extracting the polymer solution with DI water. A sample of the polymer solution was tested and verified less than 5 ppm each of ionic chloride and residual triethylamine.

The polymer solution was transferred to the precipitation feed tank. The polymer was isolated as a white powder by steam precipitation followed by drying in a cone shaped dryer using heated nitrogen (210° F.). Mw=21589 Daltons.

SiPC 3 (6D30 Copolymer).

The 6D30 copolymer (6 wt % siloxane D30 poly(siloxane-carbonate)) was made in similar fashion to Examples 14 and 15 in U.S. Pat. No. 6,870,013 using a D30 eugenol-capped siloxane fluid. The polymer contains about 6 wt % siloxane. The Mw is about 23,500 Daltons.

SiPC 4 (6D45 Copolymer).

The 6D45 polymer (6 wt % siloxane D45 poly(siloxane-carbonate)) was made in similar fashion to Examples 14 and 15 in U.S. Pat. No. 6,870,013 using D45 eugenol-capped siloxane fluid. The polymer contains about 6% siloxane. The Mw is about 23,000 Daltons.

SiPC 5 (20D45 Copolymer):

The 20D45 polymer (20 wt % siloxane D45 poly(siloxane-carbonate)) was made in a like manner to the 5D10 poly (siloxane-carbonate) except that a D45 eugenol-capped siloxane fluid was used. The polymer contains about 20% siloxane. The Mw is about 30,000 Daltons.

The additive types and details that were used in the compositions of the Examples are shown in Table 2.

TABLE 2

| Component | Chemical Name | Supplier | Grade |
|---|---|---|---|
| Phosphite | Tris (2,4-di-tert-butylphenyl) phosphite | various | |
| DF1040 | Methylhydrogen siloxane fluid | Momentive Performance Materials | DF 1040 |
| OPTS | Octaphenylcyclotetrasiloxane | Shin-Etsu Chemical Company | — |
| D4 | Octamethyltetrasiloxane | Aldrich Chemical Company | — |
| KSS | Potassium diphenylsulfone sulfonato | Arichem LLC | KSS |
| Rimar salt | Potassium perfluorobutane sulfonato | Lanxess | Bayowet C4 |
| STB | Sodium trichlorobenzene sulfonato sesquihydrate | Arichem LLC | STB |
| TSAN | SAN encapsulated PTFE | Sabic Innovative Plastics | TSAN |
| $TiO_2$ Type 1 | Titanium dioxide, (organic coating) | Kronos | Kronos 2233 |
| $TiO_2$ Type 2 | Titanium dioxide, (organic coating) | Kronos | KRONOS 2450 |
| Phosphorus acid | Phosphorus acid solution (0.15%) | | |
| Tinuvin 1577 | 2-(4,6-Diphenyl-1,3,5-triazin-2-yl)-5-hexyloxyphenol | Ciba Specialty Company Corp. | Tinuvin 1577 FF |
| UVA 234 | 2-(2-hydroxy-3,5-di-cumyl)benzotriazole | Ciba Specialty Company Corp. | Tinuvin 234 |
| Cyasorb 3638 | 4H-3, 1-benzoxazin-4-one,2,2'-(1,4-phenylene)bis- | CYTEC Industries | CYASORB UV-3638 |

Extrusion and Molding Conditions.

Extrusions were performed either on a single screw extruder or a twin-screw extruder. Typically, the D10 poly (siloxane-carbonate)-containing compositions and corresponding controls were performed on a single or a twin screw extruder. The D30 and D40 poly(siloxane-carbonate)-containing compositions and corresponding controls were performed on a twin screw extruder.

The compositions prepared with a single screw extruder were made as follows. All ingredients were dry blended for about 4 minutes using a paint shaker. The single screw extruder was a Sterling 1¾ inch (44.5 mm) extruder (Length/Diameter (L/D) ratio=24/1, with a vacuum port located near die face, with barrel and die temperature set points of 270, 275, 288, 288° C.).

The compositions prepared on the 30 mm WP twin screw extruder were made as follows. All ingredients were dry blended for about 4 minutes using a paint shaker or a drum tumbler. The twin screw extruder contained a vacuum port located near die face. Typically, the compositions were compounded with an applied vacuum of 20+ inches of Hg.

The compositions prepared on a W&P 50 mm Mega twin screw were made as follows. All additives (stabilizers and/or colorants) were dry blended off-line as concentrates using one of the primary polymer powders as a carrier and starve-fed via gravimetric feeder(s) into the feed throat of the extruder. The remaining polymer(s) were starve-fed via gravimetric feeder(s) into the feed throat of the extruder as well. The compositions were compounded with an applied vacuum of 20+ inches of Hg. The extruder was a nine-barrel machine (approx. Length/Diameter (L/D) ratio=36:1) with a vacuum port located in barrel 7.

The compositions were molded after drying at 121° C. for 4 hrs on a 260-ton (236 metric ton) Van Dorn or an 85 Ton Van Dorn molding machine operating at about 300 to 320° C. with a mold temperature of about 80° C. It will be recognized by one skilled in the art that the method is not limited to these temperatures or processing equipment.

Testing Methods.

Standard ASTM testing was performed at 50% relative humidity (RH) and unless otherwise indicated at room temperature (RT).

Notched Izod (NI-125) testing was conducted according to ASTM D 256-10 on a molded sample having a 0.125 inch (3.2 mm) thickness.

Multiaxial impact (MAI) was measured at a speed of 3.3 m/s on a 3.2×102 mm disc using a plunger with a hemispherical end and a diameter 12.70 mm in accordance with ASTM D3763

Heat deflection temperature was measured on an annealed 3.2 mm sample in accordance with ASTM D 648 using a stress of 0.455 or 1.82 Mpa.

The tensile properties were measured in accordance with ASTM D638 at 50 mm/min.

The flexural properties were measured in accordance with ASTM D 790 at 1.27 mm/min.

In most cases, melt volume ratio (MVR) was run at 300° C./1.2 Kg at 360 second dwell.

Molecular weight was measured via GPC using polycarbonate standards.

The reported transmission data (% T) was measured at the indicated thickness on a Gretagmacbeth Color-Eye 7000A (Propalette Optiview Gold version 5.2.1.7) using the color space CIE1931 (Illuminant C and a 2° observer) and is equivalent to the "Y" tristimulus value.

The reported the yellowness Index (YI) data was measured at the indicated thickness on a Gretagmacbeth Color-Eye 7000A (Propalette Optiview Gold version 5.2.1.7) in accordance with ASTM E313-73 (D1925) using Illuminant C and a 2° observer.

Heat release testing was performed on 15.2×15.2 cm plaques 1.5 mm thick using the Ohio State University (OSU) rate-of-heat release apparatus, in accordance with the method shown in FAR 25.853 (d), and in Appendix F, section IV (FAR F25.4). Total heat release was measured at the two-minute mark in kW-min/m$^2$ (kilowatt minutes per square meter). Peak heat release was measured as kW/m$^2$ (kilowatts per square meter). The heat release test method is also described in the "Aircraft Materials Fire Test Handbook" DOT/FAA/AR-00/12, Chapter 5 "Heat Release Test for Cabin Materials."

Smoke density testing (ASTM E-662-83, ASTM F-814-83, Airbus ABD0031, Boeing BSS 7239) was performed on 7.5×7.5 cm plaques of 1.5 mm thickness according to the method shown in FAR 25.853 (d), and in Appendix F, section V (FAR F25.5). Smoke density was measured under flaming mode. Smoke density ($D_s$) at 4.0 min, and the max level (DsMax) were reported.

Low Heat Release and Low Smoke Density Compositions.

1. 1D10 (SiPC 1) Blends with TBBPA-BPA Copolymer.

Table 3 illustrates that a combination of a poly(siloxane-carbonate) having an average siloxane block length (D) of about 10 units and 1 wt % siloxane in the copolymer and a bromine-containing copolycarbonate can produce a blend composition with excellent flame and smoke performance (EX 1-4) compared with compositions having only the brominated copolycarbonate (CEX 2-6), only the poly(siloxane-carbonate) (CEX 1) or only a polycarbonate without either the poly(siloxane-carbonate) or the brominated polycarbonate present (CEX 2).

Specifically a composition having poly(siloxane-carbonate) in combination with a polycarbonate (CEX 1) passes the smoke testing (DsMax) target of less than 200 with a value of 109 but fails the 2-minute OSU test target of less than 65 kW-min/m$^2$ with a value of 68 and also fails the peak OSU test target of less than 65 with a value of 98. As brominated copolycarbonate is added to the composition the 2-minute OSU performance and the peak OSU performance improves (EX 1-EX 4) and both the target values for the 2-minute and peak OSU target values are achieved (values below 65) while the smoke performance (DsMax) is maintained at passing levels (values less than 200). This improvement in flame test performance was achieved with as little as 5.2 wt % bromine in the composition (EX 1). In addition, EX 1-EX 4 all have densities below the targeted maximum density of 1.320 for aircraft applications. A polycarbonate composition without the poly(siloxane-carbonate) or the brominated copolycarbonate(CEX 2) also fails both the 2-minute and peak OSU performance tests with values of 73 and 139 although it too passes the smoke test (DsMax) with a value of 139. The benefit of the presence of siloxane in the composition is illustrated by compositions that only contain the brominated copolycarbonate only (CEX 3-6). They pass the OSU flame testing with 2-minute values of less than 65 and the OSU peak testing with values of less than 65 but perform very poorly in the smoke test exceeding the target of less than 200 with values of 561, 382 and 467.

Furthermore, the clarity as measured by % transmission and % haze is excellent for the poly(siloxane-carbonate)compositions with the brominated copolycarbonate (EX 1-4) with transmission values of 88% or greater and haze values of 1.2% or less. These values are as good or better than the polycarbonate control (CEX 2) with a transmission of 89 and a % haze of 2.4. The yellowness index value, a measure of how

TABLE 3

| Components and Properties | | CEX 1 | EX 1 | EX 2 | EX 3 | EX 4 |
|---|---|---|---|---|---|---|
| TBBPA-BPA | | 0 | 20 | 30 | 40 | 50 |
| SiPC 1 | | 40 | 40 | 40 | 40 | 40 |
| PC 2 | | 60 | 40 | 30 | 20 | 10 |
| IRGAPHOS 168 | | 0.0 | 0.0 | 0.0 | 0.0 | 0.0 |
| Formulated Composition | Total wt % Siloxane | 0.4 | 0.4 | 0.4 | 0.4 | 0.4 |
| | Total wt % Bromine | 0 | 5.2 | 7.8 | 10.4 | 13 |
| | ~Siloxane D Length | 10 | 10 | 10 | 10 | 10 |
| MVR | | 6.5 | 6.0 | 5.6 | 5.6 | 5.3 |
| NI-125, RT | Ductility | 100 | 100 | 0 | 0 | 0 |
| | J/m | 949 | 867 | 128 | 109 | 92 |
| | Ft-lbs/in | 17.8 | 16.2 | 2.4 | 2.0 | 1.7 |
| MAI-RT | Ductility | 100.0 | 100.0 | 100.0 | 100.0 | 100.0 |
| Energy to max load-Avg | J | 79 | 78 | 76 | 75 | 81 |
| Energy to failure-Avg | J | 91 | 90 | 89 | 88 | 89 |
| Energy, Total-Avg | J | 91 | 90 | 89 | 88 | 89 |
| Density-Avg | g/cc | 1.194 | 1.239 | 1.268 | 1.288 | 1.314 |
| Specific Gravity-Avg | | 1.197 | 1.242 | 1.271 | 1.291 | 1.317 |
| HDT-ASTM-GLB-MTV | 1.8 MPa | 128 | 132 | 137 | 137 | 142 |
| OSU Test FAR25.853 (d) Appendix F, Part IV | | | | | | |
| 2 Min OSU | Average | 68 | 35 | 30 | 25 | 11 |
| | Standard deviation | 14 | 7 | 1 | 4 | 10 |
| Peak OSU | Average | 98 | 63 | 54 | 48 | 43 |
| | Standard deviation | 8 | 4 | 3 | 2 | 1 |
| NBS Smoke Density (ASTM F814/E662, Flaming Mode) | | | | | | |
| DsMax | Ave | 109 | 139 | 68 | 97 | 59 |
| | Standard deviation | 28 | 44 | 32 | 18 | 23 |
| Optical Properties | | | | | | |
| Optical Properties | % T at 62 mil (1.58 mm) | 89 | 89 | 89 | 88 | 88 |
| | YI | 2.7 | 2.7 | 2.9 | 5.1 | 5.2 |
| | % Haze | 1.0 | 0.6 | 0.7 | 0.8 | 1.2 |

| Components and Properties | | CEX 2 | CEX 3 | CEX 4 | CEX 5 | CEX 6 |
|---|---|---|---|---|---|---|
| TBBPA-BPA | | 0 | 20 | 30 | 40 | 80 |
| SiPC 1 | | | | | | |
| PC 2 | | 100 | 80 | 70 | 60 | 50 |
| IRGAPHOS 168 | | 0.0 | 0.0 | 0.0 | 0.0 | 0.0 |
| Formulated Composition | Total wt % Siloxane | 0 | 0 | 0 | 0 | 0 |
| | Total wt % Bromine | 0 | 5.2 | 7.8 | 10.4 | 13 |
| | ~Siloxane D Length | — | — | — | — | — |
| MVR | | 6.4 | 6.6 | 6.8 | 6.8 | 6.4 |
| NI-125, RT | Ductility | 100 | 100 | 0 | 0 | 0 |
| | J/m | 887 | 850 | 130 | 91 | 87 |
| | Ft-lbs/in | 16.6 | 15.9 | 2.4 | 1.7 | 1.6 |
| MAI-RT | Ductility | 100.0 | 100.0 | 100.0 | 100.0 | 100.0 |
| Energy to max load-Avg | J | 75 | 75 | 76 | 78 | 78 |
| Energy to failure-Avg | J | 81 | 81 | 82 | 84 | 83 |
| Energy, Total-Avg | J | 81 | 81 | 84 | 84 | 83 |
| Density-Avg | g/cc | 1.198 | 1.242 | 1.265 | 1.289 | 1.315 |
| Specific Gravity-Avg | | 1.198 | 1.243 | 1.266 | 1.290 | 1.316 |
| HDT-ASTM-GLB-MTV | 1.8 MPa | 132 | 137 | 139 | 142 | 143 |
| OSU Test FAR25.853 (d) Appendix F, Part IV | | | | | | |
| 2 Min OSU | Average | 73 | 24 | 26 | 30 | 17 |
| | Standard deviation | 19 | 4 | 5 | 3 | 2 |
| Peak OSU | Average | 139 | 70 | 57 | 66 | 56 |
| | Standard deviation | 14 | 11 | 5 | 8 | 14 |
| NBS Smoke Density (ASTM F814/E662, Flaming Mode) | | | | | | |
| DsMax | Ave | 137 | 561 | 382 | 457 | 304 |
| | Standard deviation | 19 | 164 | 69 | 243 | 181 |
| Optical Properties | | | | | | |
| Optical Properties | % T at 62 mil (1.58 mm) | 89 | 89 | 89 | 88 | 88 |
| | YI | 2.4 | 3.3 | 4.1 | 5.0 | 5.0 |
| | % Haze | 2.4 | 1.7 | 1.4 | 1.8 | 1.7 | yellow the part appears, for EX 1 and EX 2 at 2.7 and 2.9 is also very close to the value for the polycarbonate control 2.4. As the brominated copolycarbonate content increases the yellowness index increases significantly from 2.5 (EX 1) at 5.2% bromine content to 5.2 at 13% bromine content (EX 4). High clarity, low yellowness, and low density values in combination with excellent flame and smoke performance are critical for use of these compositions in airplane window applications and so higher bromine content compositions are expected to have limited utility in window applications.

Notched Izod impact values at or near 2 ft-lbs/in (1.00 J/cm) or greater can also provide sufficient ductility for preparation of polycarbonate sheet for use in window applications and EX 1-3 possess the targeted ductility performance for window applications as well. As the bromine contents of the compositions increase the notched Izod ductility decreases to values less than 2 (EX 4 and CEX 5-6) and so high bromine contents in the compositions at 11% or greater would likely not be useful in window applications.

2. 5D10 Compositions (SiPC 2) with TBBPA-BPA Copolymer

The results in Table 4 using a poly(siloxane-carbonate) having an average siloxane block length of 10 units and 5 wt % siloxane in the copolycarbonate further illustrates that a combination of poly(siloxane) block copolycarbonates and a brominated copolycarbonate outperforms either poly(siloxane) block co polycarbonate compositions or the brominated polycarbonate compositions in OSU flame and smoke density testing.

and brominated copolycarbonate passed OSU flame and peak heat test with values below 65 and exhibited Dmax smoke results of less than 15 with standard deviations below 4.4 units.

3. 6D30 (SiPC 2), 6D45 (SiPC 3) and 20D45 (SiPC 3) Compositions with TBBPA-BPA Copolymer The flame and smoke performances of a series of compositions using a bromine copolycarbonate having 26 wt % bromine atoms with siloxane block co-polycarbonates having average siloxane chain lengths of 45 and 30 and siloxane contents of 6 wt % in the copolymer and with a poly(siloxane-carbonate) having an average of 45 siloxane units and 20 wt % siloxane in the copolymer are shown in Table 5.

Examples EX 9-22 illustrate that the OSU flame and heat performance as well as smoke performance is maintained in compositions of poly(siloxane-carbonate)s and brominated polycarbonate copolymers with siloxane change lengths of

TABLE 4

| Components and Properties | | | CEX 7 | EX 5 | EX 6 | EX 7 | EX 8 | CEX 8 |
|---|---|---|---|---|---|---|---|---|
| TBBPA-BPA | | | 0 | 50 | 70 | 80 | 90 | 100 |
| SiPC 2 | | | 100 | 50 | 30 | 20 | 10 | 0 |
| IRGAPHOS 168 | | | 0.06 | 0.06 | 0.06 | 0.06 | 0.06 | 0.06 |
| Formulated | Total wt % Siloxane | | 5.0 | 2.5 | 1.5 | 1.0 | 0.5 | 0.0 |
| Composition | Total wt % Bromine | | 0.0 | 13.0 | 18.2 | 20.8 | 23.4 | 26.0 |
| | ~Siloxane D Length | | 10 | 10 | 10 | 10 | 10 | 10 |
| MVR-6 min | Cc/10 min. | | 18.4 | 10.1 | 7.9 | 7.6 | 5.6 | 4.6 |
| Tg | °C. | | 141 | 161 | 168 | 170 | 178 | 182 |
| NI-125 RT | Ductility | | 100 | 0 | 0 | 0 | 0 | 0 |
| | J/m | | 721 | 127 | 78 | 68 | 57 | 50 |
| | ft-lbs/in | | 13.5 | 2.4 | 1.5 | 1.3 | 1.1 | 0.9 |
| MAI-RT | Ductility | | 100 | 100 | 100 | 100 | 100 | 60 |
| Energy to max load-Avg | J | | 65 | 66 | 76 | 76 | 77 | 77 |
| Energy to failure-Avg | J | | 73 | 72 | 82 | 82 | 82 | 83 |
| Energy, Total-Avg | | | 73 | 72 | 82 | 83 | 82 | 83 |
| Modulus of Elasticity-Avg | MPa | | 2220 | 2410 | 2500 | 2620 | 2660 | |
| Stress at Yield-Avg | MPa | | 58 | 68 | 72 | 74 | 77 | |
| Stress at Break-Avg | MPa | | 50 | 60 | 61 | 61 | 65 | |
| Elongation at Yield-Avg | % | | 6 | 7 | 7 | 7 | 7 | |
| Elongation at Break-Avg | % | | 87 | 105 | 95 | 92 | 102 | |
| Flexural Modulus-Avg | MPa | | 2100 | 2280 | 2480 | 2420 | 2450 | |
| Flex Stress at 5% Strain-Avg | MPa | | 84 | 93 | 99 | 98 | 101 | |
| Flexural Stress at Yield-Avg | MPa | | 92 | 106 | 114 | 113 | 118 | |
| Density-Avg | g/cc | | 1.183 | 1.307 | 1.363 | 1.385 | 1.422 | 1.450 |
| Specific Gravity-Avg | | | 1.186 | 1.310 | 1.367 | 1.388 | 1.426 | 1.454 |
| HDT-ASTM-GLB-MTV | 1.8 MPa | | 117 | 134 | 136 | 146 | 150 | 156 |
| HDT-ASTM-GLB-MTV | 0.455 MPa | | 130 | 147 | 154 | 159 | 165 | 171 |
| OSU Test FAR25.853 (d) Appendix F, Part IV | | | | | | | | |
| OSU 2 Min. | Average | | 102 | 40 | 27 | 34 | 28 | 26 |
| | Standard deviation | | 11 | 3 | 6 | 3 | 6 | 5 |
| OSU Peak | Average | | 93 | 45 | 37 | 36 | 37 | 47 |
| | Standard deviation | | 13 | 2 | 3 | 3 | 3 | 12 |
| NBS Smoke Density (ASTM F814/E662, Flaming Mode) | | | | | | | | |
| DsMax | Ave | | 80.7 | 14.7 | 12.0 | 9.0 | 12.7 | 60.7 |
| | Standard deviation | | 33.6 | 0.6 | 4.4 | 2.6 | 2.1 | 20.5 |
| Optical Properties | | | | | | | | |
| % T at 62 mil (1.58 mm) | | | 88.6 | 85.8 | 86.0 | 86.5 | 88.2 | 89.0 |
| YI | | | 2.8 | 13.4 | 13.1 | 6.4 | 3.8 | 2.9 |
| % Haze | | | 12.2 | 5.5 | 4.1 | 2.4 | 0.9 | 1.1 |

CEX 7 contains no bromine and fails both the OSU 2 min total and peak heat release tests with values greater than 65. CEX 7 in this test passed the $D_{max}$ flame test. CEX 8 has no siloxane present and it passes the OSU flame and peak heat release test with values below 65 but the Dmax values while passing with a value below 200, However, CEX 8 is extremely brittle which would make it difficult to machine and form into parts, and has a high density, which would by deleterious to weight savings needed to manufacture fuel efficient aircraft. By contrast, compositions having poly(siloxane-carbonate)

30 and 45 siloxane units and siloxane wt % as low as 5 wt % and as high as 20 wt % in the copolymers. Comparative example CEX 9 and CEX 5 (Table 3) that have no poly (siloxane-carbonate) in the compositions either fail the DsMax smoke test with a value of 195 and 457 or inconsistently pass as a result of high values and a high standard deviation of 78 and 243 units, respectively. This result illustrates once again that the presence of siloxane in the blend is necessary to achieve consistent smoke performance pass values.

EX 16 (without heat stabilizer), when compared with EX 17 (contain similar siloxane and bromine content as EX 16 but with heat stabilizer), demonstrates that the heat stabilizer IRGAPHOS 168 has no significant effect on the flame or smoke performance in the compositions.

High Impact Compositions.

Formulations passing both the OSU flame and smoke tests and having excellent room temperature ductility performance and high flow properties can also be achieved by some of the combinations of brominated polycarbonate copolymers and poly(siloxane-carbonate)s. For Example EX 9, 12 and 22 in Table 5 passed the 2-min flame and heat release tests with flame and heat release values less than 65 and smoke values below 200 and showed excellent room temperature ductility with 100% ductility and with impact energies of greater than 500 J/m at high melt flow values (MVR values of 9.6-12 cc/10 min.). The results from Table 5 shows that compositions with polysiloxane content greater than 1% achieve high room temperature impact (both EX 14 and EX 15 have identical bromine content but EX 14 has 1% polysiloxane content while EX 15 has 2 wt % polysiloxane content and EX 14 has no ductility and room temperature while EX 15 shows partial room temperature ductility). Furthermore it is also desirable for the compositions to have less than 13 wt % brominated copolycarbonate content in order to achieve high ductility (EX 9 and EX 10 both have 2 wt % polysiloxane in their compositions but EX 9 has 10.4 wt % bromine content from the brominated copolymer while EX 10 has 13 wt % bromine content and EX 9 has excellent room temperature impact while EX 10 has low room temperature impact). The examples show that the poly(siloxane-carbonate)s that have 20 wt % polysiloxane content are somewhat more efficient in providing high ductility and room temperature impact strength than the copolymers with 6 wt % content. EX 9 was made from a poly(siloxane-carbonate) having 20 wt % polysiloxane in the copolymer and EX 15 was made from a poly(siloxane-carbonate) having 6 wt % polysiloxane in the copolymer, and both have identical bromine and polysiloxane contents, but EX 9 has a higher impact and ductility value than EX 15.

TABLE 5

| Components, Properties | | | EX 9 | EX 10 | EX 11 | EX 12 | EX 13 | EX 14 | EX 15 | EX 16 |
|---|---|---|---|---|---|---|---|---|---|---|
| TBBPA-BPA | | | 40 | 50 | 60 | 30 | 40 | 40 | 40 | 40 |
| 20D45 SiPC 5 | | | 10 | 10 | 10 | | | | | |
| 6D45 SiPC 4 | | | | | | 34 | 9 | 17 | 34 | 34 |
| 6D30 SiPC 3 | | | | | | | | | | |
| PC1 | | | 50 | 40 | 30 | 36 | 51 | 43 | 26 | 26 |
| PC 2 | | | | | | | | | | |
| IRGAPHOS 168 | | | 0.06 | 0.06 | 0.06 | 0.06 | 0.06 | 0.06 | 0.06 | 0.00 |
| Total | Wt % Siloxane | | 2.0 | 2.0 | 2.0 | 2.0 | 0.5 | 1.0 | 2.0 | 2.0 |
| Formulation | Wt % Bromine | | 10.4 | 13.0 | 15.6 | 7.8 | 10.4 | 10.4 | 10.4 | 10.4 |
| | ~Siloxane D Length | | 45 | 45 | 45 | 45 | 45 | 45 | 45 | 45 |
| MVR-6 min | Cc/10 min | | 11.1 | 9.7 | 7.5 | 13.6 | 15.8 | 13.7 | 11.4 | 11.4 |
| Tg | °C. | | 160 | 162 | 168 | 156 | 160 | 160 | 160 | 160 |
| NI-125 RT | Ductility | | 100 | 0 | 0 | 100 | 0 | 0 | 60 | 40 |
| | J/m | | 579.0 | 154.0 | 136.0 | 646 | 105 | 122 | 371 | 304 |
| | ft-lbs/in | | 10.8 | 2.9 | 2.5 | 12.1 | 2.0 | 2.3 | 6.9 | 5.7 |
| MAI-RT | Ductility | | 100 | 100 | 100 | 100 | 100 | 100 | 100 | 100 |
| | Energy to max load-Avg | J | 71 | 74 | 76 | 75 | 73 | 77 | 75 | 75 |
| | Energy to failure-Avg | J | 75 | 77 | 81 | 82 | 77 | 82 | 83 | 81 |
| | Energy, Total-Avg | J | 75 | 77 | 81 | 82 | 77 | 82 | 83 | 81 |
| | Density-Avg | g/cc | 1.281 | 1.306 | 1.330 | 1.254 | 1.284 | 1.281 | 1.277 | 1.276 |
| | Specific Gravity-Avg | | 1.284 | 1.309 | 1.333 | 1.257 | 1.287 | 1.284 | 1.280 | 1.279 |
| HDT | 1.8 MPa | | 139 | 141 | 144 | 128 | 134 | 133 | 132 | 132 |
| 2 Min OSU | Average | | 32 | 23 | 19 | 46 | 39 | 41 | 45 | 35 |
| | Std. dev. | | 3.2 | 1.9 | 4.7 | 5.7 | 3.6 | 6.0 | 4.5 | 2.7 |
| Peak OSU | Average | | 50 | 42 | 41 | 55 | 49 | 48 | 55 | 46 |
| | Std. dev. | | 3.8 | 2.3 | 3.1 | 3.0 | 3.4 | 3.3 | 2.2 | 4.1 |
| DsMax | Ave | | 45 | 48 | 61 | 30 | 15 | 14 | 18 | 29 |
| | Std. dev. | | 13 | 9 | 35 | 8 | 6 | 7 | 10 | 12 |
| % T at 62 mil (1.58 mm) | | | | | | | | | | |
| YI | | | | | | | | | | |
| % Haze | | | | | | | | | | |
| YI at 125 mil (3.2 mm) | | | 39 | 43 | 47 | 12 | 6 | 9 | 15 | 14 |
| % T at 125 mil (3.2 mm) | | | 29.6 | 27.3 | 24.1 | 83.1 | 86.7 | 84.8 | 80.8 | 81.6 |
| % Haze at 125 mil (3.2 mm) | | | 99.2 | 99.2 | 99.9 | 3.3 | 1.6 | 2.2 | 4.9 | 3.9 |

| Components, Properties | | | EX 17 | EX 18 | EX 19 | EX 20 | EX 21 | EX 22 | CEX 9 |
|---|---|---|---|---|---|---|---|---|---|
| TBBPA-BPA | | | 40 | 50 | 60 | 70 | 50 | 40 | 40 |
| 20D45 SiPC 5 | | | | | | | | | |
| 6D45 SiPC 4 | | | 34 | 34 | 34 | 25 | | | |
| 6D30 SiPC 3 | | | | | | | 42 | 50 | 60 |
| PC1 | | | 26 | 16 | 6 | | | | |
| PC 2 | | | | | | 5 | 8 | 10 | 0.060 |
| IRGAPHOS 168 | | | 0.06 | 0.06 | 0.060 | 0.060 | 0.06 | 0.06 | 0.06 |
| Total | Wt % Siloxane | | 2.0 | 2.0 | 2.0 | 1.5 | 2.5 | 3.0 | 0.0 |
| Formulation | Wt % Bromine | | 10.4 | 13.0 | 15.6 | 18.2 | 13.0 | 10.4 | 10.4 |
| | ~Siloxane D Length | | 45 | 45 | 45 | 45 | 30 | 30 | — |
| MVR-6 min | Cc/10 min | | 10.5 | 9.0 | 7.0 | 6.0 | 7.3 | 7.7 | 15.4 |
| Tg | °C. | | 159 | 163 | 167 | 171 | 164 | 161 | 158 |
| NI-125 RT | Ductility | | 0 | 0 | 0 | 0 | 0 | 100 | 0 |
| | J/m | | 160.0 | 129.0 | 102.0 | 83.8 | 139 | 513.0 | 83.2 |
| | ft-lbs/in | | 3.0 | 2.4 | 1.9 | 1.6 | 2.6 | 9.6 | 1.6 |

TABLE 5-continued

|  |  |  |  |  |  |  |  |  |  |
|---|---|---|---|---|---|---|---|---|---|
| MAI-RT | Ductility |  | 100 | 100 | 100 | 100 | 100 | 100 | 100 |
| Energy to max load-Avg |  | J | 73 | 73 | 71 | 73 | 58 | 72 | 69 |
| Energy to failure-Avg |  | J | 79 | 79 | 76 | 79 | 63 | 77 | 73 |
| Energy, Total-Avg |  | J | 79 | 79 | 76 | 79 | 63 | 77 | 73 |
| Density-Avg |  | g/cc | 1.281 | 1.307 | 1.329 | 1.360 | 1.305 | 1.277 | 1.291 |
| Specific Gravity-Avg |  |  | 1.285 | 1.311 | 1.333 | 1.364 | 1.308 | 1.280 | 1.294 |
| HDT | 1.8 MPa |  | 136 | 140 | 142 | 143 | 136 | 131 | 139 |
| 2 Min OSU | Average |  | 27 | 23 | 20 | 34 | 32 | 40 | 28 |
|  | Std. dev. |  | 6.7 | 3.1 | 0.6 | 2.3 | 2 | 2 | 10.1 |
| Peak OSU | Average |  | 47 | 45 | 42 | 38 | 33 | 42 | 54 |
|  | Std. dev. |  | 2.5 | 3.1 | 3.5 | 3.5 | 2 | 1 | 8.1 |
| DsMax | Ave |  | 53 | 61 | 43 | 20 | 76 | 58 | 195 |
|  | Std. dev. |  | 22 | 10 | 12 | 4 | 55 | 15 | 78 |
| % T at 62 mil (1.58 mm) |  |  |  |  |  | 75 | 79 | 87 |  |
| YI |  |  |  |  |  | 22.5 | 12.0 | 5.1 |  |
| % Haze |  |  |  |  |  | 14.6 | 12.1 | 6.6 |  |
| YI at 125 mil (3.2 mm) |  |  | 16 | 23 | 28 |  |  |  | 2 |
| % T at 125 mil (3.2 mm) |  |  | 79.9 | 72.9 | 63.9 |  |  |  | 89.3 |
| % Haze at 125 mil (3.2 mm) |  |  | 4.4 | 10.7 | 23.6 |  |  |  | 0.6 |

In addition the data in Table 5 show that high impact values could be achieved using both the poly(siloxane-carbonate)s having average siloxane chain lengths of 45 and 30 repeating units. Furthermore, the high ductility can be achieved with copolymers having either 20% polysiloxane content or 6% polysiloxane content. In the case of the poly(siloxane-carbonate)s that have 6% polysiloxane content, it is also possible to achieve transparency. One particular benefit of the use of long siloxane chain lengths (chain lengths greater than 10 repeating units) and with about 6 wt % siloxane in the poly (siloxane-carbonate) copolymer is that a combination of high impact and transparency can be achieved in addition to maintaining excellent OSU flame and smoke performance in the compositions. Specifically EX 12 with 2 wt % siloxane and 7.8 wt % bromine content and that is formulated from a poly(siloxane-carbonate) having an average chain length of 45 siloxane and about 6 wt % siloxane in the copolymer has 100% room temperature ductility during notched Izod testing, excellent haze with a value of 3.3% and an excellent % transmission with of value of 88% while having an OSU flame value of 46, a peak heat release value of 55 and a DsMax smoke value of 30. EX 22 with 3.0 wt % siloxane and 10.4 wt % bromine that is formulated from a poly(siloxane-carbonate) having an average chain length of 30 siloxane units and about 6 wt % siloxane in the copolymer also shows excellent impact performance, transparency, haze and flame and smoke performance.

Transparent Compositions.

Formulations that pass the OSU and smoke testing and that have very high percent transmission values (greater than 85%), very low haze values (less than 2.5%) and low yellowness values (less than 6) are also possible to obtain using compositions of poly(siloxane-carbonate)s and brominated polycarbonate copolymers. Formulations with high transmission, low haze and low yellowness index values that pass OSU flame and smoke tests are particularly useful in window articles, gauge and dashboard covers and in window dust covers on aircraft. Formulations that meet the OSU flame and smoke and requirements and that have high percent transmissions, low haze and low yellowness index values can be obtained from a variety of poly(siloxane-carbonate)s with the brominated polycarbonate copolymer. Examples include EX 1, EX 2, EX 3 and EX 4 from Table 3 above prepared from a poly(siloxane-carbonate) having 10 polysiloxane repeating units and 1 wt % polysiloxane content in the copolymer; EX 5, EX 6, EX 7, and EX 8 from Table 4 above prepared from a poly(siloxane-carbonate) have 10 polysiloxane repeating units and 5 wt % polysiloxane content in the copolymer; EX 13 and EX 14 from Table 5 above prepared from a poly (siloxane-carbonate) have 45 polysiloxane repeating units and 6 wt % polysiloxane content in the copolymer and EX 22 from Table 5 above prepared from a poly(siloxane-carbonate) have 30 polysiloxane repeating units and 6 wt % polysiloxane content in the copolymer. The yellowness index generally increases as the wt % of brominated copolycarbonate in the compositions increases, the percent haze generally increases as the wt % polysiloxane in the composition increases and the chain length of the polysiloxane increases (30 and 45 polysiloxane chain lengths are worse than 10 polysiloxane chain lengths) and the % polysiloxane in the copolymer increases (20 wt % polysiloxane in the copolymer is much worse than 6 wt % polysiloxane) The results further suggest that the poly(siloxane-carbonate) providing the best transparency, haze and YI values and yellowness index values for use in window applications is the poly(siloxane-carbonate) having approximately 10 polysiloxane repeating units and 1 wt % polysiloxane content in the copolymer.

Low OSU Heat Release, Low Smoke, $TiO_2$-Containing Compositions.

Titanium dioxide is a common additive used to increase the whiteness of polymer compositions. Compositions having poly(siloxane-carbonate) and brominated copolycarbonate were prepared that also contained various amounts of titanium dioxide in order to determine its effect on density and stability of the polycarbonate compositions. The results are shown in Table 6.

TABLE 6

| Blend Composition Components | EX 23 | EX 24 | EX 25 | EX 26 | EX 27 | EX 28 | EX 29 |
|---|---|---|---|---|---|---|---|
| TBBPA-BPA | 40.0 | 40.0 | 40.0 | 40.0 | 40.0 | 40.0 | 40.0 |
| SiPC 4 | 50.00 | 50.00 | 50.00 | 50.00 | 50.00 | 50.0 | 50.00 |
| PC 1 | 10.0 | 10.0 | 10.00 | 10.00 | 10.00 | 10.0 | 10.0 |
| $TiO_2$ | 0.0 | 1.0 | 2.0 | 3.0 | 4.0 | 5.0 | 7.0 |
| IRGAPHOS 168 | 0.06 | 0.06 | 0.06 | 0.06 | 0.06 | 0.06 | 0.06 |

TABLE 6-continued

| Blend Composition Components | | EX 23 | EX 24 | EX 25 | EX 26 | EX 27 | EX 28 | EX 29 |
|---|---|---|---|---|---|---|---|---|
| Total Formulation | Total wt % Siloxane | 3.00 | 3.00 | 3.0 | 3.00 | 3.00 | 3.00 | 3.00 |
| | Total wt % Bromine | 10.4 | 10.4 | 10.4 | 10.4 | 10.4 | 10.4 | 10.4 |
| MVR-6 min | | 8.2 | 8.7 | 8.86 | 8.69 | 8.44 | 8.52 | 8.46 |
| MVR-18 min | | 8.8 | 9.3 | 9.73 | 9.73 | 9.90 | 10.40 | 10.00 |
| % MVR Change 6 min to 18 min | | 7.0 | 12.9 | 18.1 | 18.1 | 20.1 | 26.2 | 21.4 |
| NI-125 RT | Ductility | 100 | 100 | 100 | 100 | 100 | 100 | 100 |
| | J/m | 577 | 608 | 592 | 544 | 515 | 520 | 487 |
| | ft-lbs/in | 10.8 | 11.4 | 11.1 | 10.2 | 9.6 | 9.7 | 9.1 |
| Density-Avg | g/cc | 1.278 | 1.282 | 1.287 | 1.305 | 1.316 | 1.319 | 1.340 |
| Specific Gravity-Avg | | 1.281 | 1.286 | 1.290 | 1.308 | 1.319 | 1.322 | 1.343 |

The data in Table 6 illustrate that melt stability decreases as the $TiO_2$ content increases (EX 24-EX 29) compared to a control that has no $TiO_2$ present (EX 23) as measured by the change in the MVR values after 6 and 18 minute heating at 300° C. To achieve 20% or less melt change, then 4 PHR or less $TiO_2$ can be used in the polycarbonate compositions (EX 24-EX 26 vs. EX 27-EX 29).

The data in Table 7 shows the effect of $TiO_2$ on the smoke density performance of a composition with and without poly(siloxane-carbonate) present.

TABLE 7

| Component, Properties | | CEX 10 | EX 30 |
|---|---|---|---|
| TBBPA-BPA Copolymer | | 40.0 | 40.0 |
| SiPC 4 | | 0.00 | 50.00 |
| PC 1 | | 60.0 | 10.0 |
| $TiO_2$ | | 2.0 | 2.0 |
| IRGAPHOS 168 | | 0.060 | 0.060 |
| Formulated Blend Composition | Total wt % Siloxane | 0 | 3 |
| | Total wt % Bromine | 10.4 | 10.4 |
| MVR-6 min | | 17.7 | 9.5 |
| MVR-18 min | | 18.6 | 10.4 |
| MVR, % Change | | 5.1 | 9.6 |
| Tg | | 160 | 161 |
| NI-125 RT | Ductility | 0.0 | 100.0 |
| | J/m | 87.7 | 467.0 |
| | ft-lbs/in | 1.6 | 8.7 |
| MAI-RT | Ductility | 100 | 100 |
| Energy to max load-Average | J | 72 | 70 |
| Energy to failure- Average | J | 76 | 76 |
| Energy, Total- Average | J | 76 | 76 |
| Density-Avg | g/cc | 1.304 | 1.293 |
| Specific Gravity-Average | | 1.308 | 1.296 |
| FAA Smoke Density | Average | 231.0 | 72.0 |
| Ds at 4 min | Standard deviation | 78.2 | 43.6 |

The results in Table 7 show that the ability of poly(siloxane-carbonate)s in the compositions to reduce smoke is not diminished by the presence of $TiO_2$ in the compositions, even though it is known in the art that $TiO_2$ can improve polycarbonate flame performance. Even with 2 PHR $TiO_2$ present, without any poly(siloxane-carbonate), CEX 10 does not pass the DsMax smoke target of less than 200, having a value of 231. By contrast EX 30 (with poly(siloxane-carbonate) present) passes the DsMax test target value of less than 200 with a value of only 72.

Furthermore the impact performance of molded parts from compositions containing $TiO_2$ is improved by the presence of a poly(siloxane-carbonate) as illustrated by Ex 24-29 in Table 6 and EX 30 in Table 7 (which show 100% ductility performance at room temperature) while CEX 10 has 0% ductility performance at room temperature.

Density of Low OSU Heat Release, Low Smoke Polycarbonate Compositions.

The density results in Tables 3-5 illustrate the factors that most strongly affect the density of the compositions that do not contain titanium dioxide. The strongest influence on density is the wt % of bromine in the polycarbonate compositions. For example in CEX 2, 3, 4, 5, and 6 in Table 3 the wt % bromine increases from 0 to 13 wt % and the density increases from 1.198 to 1.315 g/cc. A similar trend is shown in Table 4 where the wt % bromine increases from 0 to 26 wt % and the density increases from 1.183 to 1.450 g/cc. The results in Table 5 above also illustrate that increasing the amount of siloxane in the compositions does slightly decrease the density in the compositions. For example, the wt % bromine is the same in CEX 10 and EX 13-EX 15 at 10.4 wt %, but the wt % siloxane increases from 0 to 2.0 wt % and the density decreases from 1.291 to 1.277 g/cc. The chain length of siloxane or the wt % siloxane in the poly(siloxane-carbonate) does not show a large influence in the density based on the results in Table 5. In order to obtain a density below the targeted maximum density of 1.320 g/cc for aircraft applications, it appears that less than 15 wt % bromine can be used.

The presence of titanium dioxide further increases the density of the compositions as illustrated in Table 6. In Table 6, compositions are shown having 3.0 wt % siloxane and 10.4 wt % bromine contents and increasing amounts of titanium dioxide. In EX 23-29 the wt % titanium dioxide increases from 0 wt % to 7 wt % and the density increases from 1.278 to 1.340 g/cc. Therefore in order to achieve a maximum density of less than 1.320 g/cc, less than 5 wt % titanium dioxide can be used in the compositions shown in Table 6.

Combining the results from the various Tables shows achieving the targeted density maximum of 1.320 g/cc for aircraft applications can be accomplished by balancing the amount of titanium dioxide with the amount of brominated copolycarbonate. Bromine contents of less than 13 wt % and titanium contents of less than 5 wt % can be used to meet the aircraft density targets for white product compositions (EX 24-EX 27 vs. EX 28EX 29).

Alternative Bromine Sources.

Property comparisons were made between polycarbonate compositions having similar wt % polysiloxane and similar wt % bromine in the compositions using three different bromine-containing additives, in particular a brominated epoxy oligomer (F3100 from ICL Industrial Products, EX 30), a brominated polycarbonate oligomer (BC52, EX 31) and a brominated copolycarbonate (TBBPA-BPA copolymer, EX 32). Results are in Table 8.

TABLE 8

| Components | EX 31 | EX 32 | EX 33 |
|---|---|---|---|
| SiPC 4 | 50.0 | 50.0 | 50.0 |
| PC 2 | 30.70 | 30.00 | 20.00 |
| F-3100 | 19.300 | — | — |
| BC52 | — | 20.0 | — |

TABLE 8-continued

| Components | | EX 31 | EX 32 | EX 33 |
|---|---|---|---|---|
| TBBPA-BPA Copolymer | | — | — | 40.000 |
| Phosphite | | 0.060 | 0.060 | 0.060 |
| Mw of Br compound | | 15,000 | 2,665 | 22,500 |
| Softening Temp C | | 200 | 171 | 182 |
| Total Formulation | % Siloxane | 3 | 3 | 2.7 |
| | % Bromine | 10.4 | 10.4 | 9.5 |
| | D length | 45.0 | 45.0 | 45.0 |
| Properties | | | | |
| MVR-6 | | 15.7 | 11.8 | 8.3 |
| % Change | | 17.5 | 4.9 | 11.9 |
| Tg | | 146.5 | 151.4 | 159.8 |
| NI-125 RT | Ductility | 100.00 | 0.0 | 100.0 |
| | J/m | 773.0 | 123.0 | 744.0 |
| | ft-lbs/in | 14.5 | 2.3 | 13.9 |
| MAI-RT | Ductility | 100.0 | 100.0 | 100.0 |
| Energy to max load-Avg | J | 68.1 | 75.1 | 78.4 |
| Energy to failure-Avg | J | 72.6 | 79.8 | 85.0 |
| Energy, Total-Avg | J | 72.6 | 79.8 | 85.1 |
| Density-Avg | g/cc | 1.282 | 1.273 | 1.268 |
| Specific Gravity-Avg | | 1.285 | 1.276 | 1.271 |
| HDT-ASTM-G | 1.8 MPa | 123.8 | 127.7 | 135.2 |
| HDT-ASTM-G | 0.455 MPa | | | |
| OSU 2 min | TTF | 42.4 | 30.1 | 36.4 |
| | | 45.8 | 24.0 | 26.2 |
| | | 33.8 | 21.8 | 18.2 |
| | Average | 40.7 | 25.3 | 26.9 |
| | Standard deviation | 6.2 | 4.3 | 9.1 |
| OSU Peak | | 50.5 | 50.5 | 60.3 |
| | | 50.8 | 43.1 | 49.5 |
| | | 59.5 | 60.2 | 54.6 |
| | Average | 53.6 | 51.3 | 54.8 |
| | Standard deviation | 5.1 | 8.6 | 5.4 |
| FAA Smoke Density | | | | |
| Ds at 4 min | | 96.6 | 23.81 | 20.5 |
| | | 66.3 | 35.3 | 18.2 |
| | | 88.6 | 16.6 | 42.7 |
| | Average | 83.8 | 26.0 | 27.1 |
| | Standard deviation | 15.7 | 13.2 | 13.5 |
| Dmax | | 96.8 | 23.81 | 20.5 |
| | | 66.3 | 35.3 | 18.2 |
| | | 88.6 | 16.6 | 42.7 |
| | Ave | 83.9 | 26.0 | 27.1 |
| | Standard deviation | 15.7 | 13.2 | 13.5 |
| Optical Properties | | | | |
| % T at 125 mil (3.2 mm) | | 22.0 | 78.7 | 77.3 |
| YI | | 62.7 | 19.1 | 19.8 |
| % Haze | | 102.6 | 7.3 | 6.5 |

The results in Table 8 show that the targeted flame and smoke properties (2-min total heat release and peak heat values of less than 65 and a smoke Dmax value of less than 200) were achieved in polycarbonate compositions containing siloxane using the different sources of bromine as flame retardants. The high impact values in EX 31 (100% ductility in the notched Izod test) as compared to EX 32, illustrates the importance of selecting a bromine composition with an $M_W$ of at least approximately 15,000 when formulations of high toughness are needed. High transparency (greater than 75%) and low haze (less than 10%) were also found with EX 32. In addition, all three of the compositions showed density values below the 1.320 g/cc upper limit.

Other Additives

The effect of additives often used as flame retardants in polycarbonate, on the smoke density properties of compositions made from combinations of the poly(siloxane-carbonate) and brominated copolycarbonate, were also investigated and the results are shown in Table 9.

When used at levels commonly employed to improve flame performance, improve the color stability, or reduce haze in polycarbonates, the additives showed no effect on the flame retardant performance of the polycarbonate compositions. EX 34 (with TiO$_2$) possessed a similar $D_{max}$ value to EX 35-39 (with the flame retardant, color stabilization, or haze reducing additives) (EX 34 had a $D_{max}$ of 21, whereas the highest $D_{max}$ values measured for the compositions of Table 9 was 29).

TABLE 9

| Name | | EX 34 | EX 35 | EX 36 | EX 37 | EX 38 | EX 39 |
|---|---|---|---|---|---|---|---|
| TBBPA-BPA | | 40.0 | 40.0 | 40.0 | 40.0 | 40.0 | 40.0 |
| SiPC 4 | | 50.00 | 50.00 | 50.00 | 50.00 | 50.00 | 50.00 |
| PC 1 | | 10.0 | 10.0 | 10.0 | 10.0 | 10.0 | 10.0 |
| KSS | | — | 0.30 | — | — | — | — |
| KSS | | — | 0.30 | — | — | — | — |
| Rimar salt | | — | — | 0.08 | 0.08 | — | — |
| Octaphenylcyclotetrasiloxane | | — | — | — | 0.10 | — | — |
| STB | | — | — | — | — | 0.75 | — |
| Phosphorus acid solution (0.15%) | | — | — | — | — | — | 0.10 |
| TiO$_2$ | | 2.00 | 2.00 | 2.00 | 2.00 | 2.00 | 2.00 |
| Phosphite | | 0.06 | 0.06 | 0.06 | 0.06 | 0.06 | 0.06 |
| Total Formulation | Wt % Siloxane | 3.0 | 3.0 | 3.0 | 3.0 | 3.0 | 3.0 |
| | Wt % Bromine | 10.4 | 10.4 | 10.4 | 10.4 | 10.4 | 10.4 |
| Properties | | | | | | | |
| MVR-6 | Cc/10 min | 9.6 | 10.0 | 12.4 | 13.6 | 10.4 | 9.9 |
| Tg | ° C. | 159 | 157 | 160 | 159 | 160 | 160 |
| NI-125 RT | Ductility | 100 | 100 | 100 | 100 | 0 | 100 |
| | J/m | 588.0 | 544.0 | 534.0 | 596.0 | 143.0 | 498.0 |
| | ft-lbs/in | 11.0 | 10.2 | 10.0. | 11.2 | 2.7 | 9.3 |

TABLE 9-continued

| Name | EX 34 | EX 35 | EX 36 | EX 37 | EX 38 | EX 39 |
|---|---|---|---|---|---|---|
| Density-Avg g/cc | 1.287 | 1.291 | 1.291 | 1.288 | 1.293 | 1.291 |
| Specific Gravity-Avg | 1.290 | 1.294 | 1.294 | 1.291 | 1.296 | 1.294 |
| HDT-ASTM-G 1.8 MPa | 134 | 134 | 134 | 134 | 134 | 135 |

Other Silicone-Containing Additives.

The impact of replacing the poly(siloxane-carbonate) with other silicone-containing additives was also investigated and the results shown in Table 10.

TABLE 10

| Components | | CEX 11 | CEX 12 | CEX 13 | CEX 14 |
|---|---|---|---|---|---|
| TBBPA-BPA | | 30.00 | 30.00 | 30.00 | 30.00 |
| PC 2 | | 70.00 | 69.50 | 69.50 | 69.50 |
| DF1040 | | | 0.50 | | |
| OPTS | | | | 0.50 | |
| D4 | | | | | 0.500 |
| Phosphite | | 0.060 | 0.060 | 0.060 | 0.060 |
| Total Formulation | Wt % Siloxane | 0 | 0.5 | 0.5 | 0.5 |
| | Wt % Bromine | 7.8 | 7.8 | 7.8 | 7.8 |
| Properties | | | | | |
| MVR-6 | | 5.5 | 5.9 | 5.5 | 5.6 |
| NI-125 RT | Ductility | 0.0 | 0.0 | 0.0 | 0.0 |
| | J/m | 139 | 148 | 132 | 135 |
| | ft-lbs/in | 2.6 | 2.8 | 2.5 | 2.5 |
| Density-Avg | g/cc | 1.262 | 1.263 | 1.264 | 1.264 |
| Specific Gravity-Avg | | 1.265 | 1.267 | 1.267 | 1.267 |
| HDT-ASTM-G | 1.8 MPa | 136 | 135 | 136 | 135 |
| OSU Test FAR25.853 (d) Appendix F, Part IV | | | | | |
| 2 Min OSU | Average | 17 | 59 | 19 | 28 |
| | Standard deviation | 9.7 | 2.6 | 20.2 | 15.9 |
| Peak OSU | Average | 60 | 75 | 65 | 65 |
| | Standard deviation | 4.5 | 4.0 | 3.8 | 8.7 |
| NBS Smoke Density (ASTM F814/E662, Flaming Mode) | | | | | |
| DS Max | Ave | 529 | 306 | 521 | 406 |
| | Standard deviation | 84 | 197 | 219 | 199 |

The results in Table 10 show that none of the siloxane sources performed as well as the poly(siloxane-carbonate) of the invention. The results for EX 3 and EX 4 from Table 3 (with 0.4 wt % polysiloxane content and either 7.8 or 10 wt % bromine) show that both pass the OSU heat release and smoke tests, with values less than 65 for the OSU tests and less than 200 for the smoke tests. In contrast CEX 12, 13, and 14 have slightly higher amounts of siloxane (0.5 wt %) and the same amount of bromine (7.8 wt %) and fail the smoke tests with DsMax values of 300 or greater. These other sources of silicone are therefore much less effective at suppressing smoke in the smoke tests than poly(siloxane-carbonate) described herein. While not wishing to be bound by any specific theory, it is believed that providing the siloxane in a less volatile, less mobile (higher Tg), high molecular weight polymer could help to maintain the siloxane in the composition longer and keep the siloxane better dispersed during burning.

Color Stability and Weathering Performance.

Materials used in the transportation industry, especially those that pass the OSU and DsMax smoke requirements, often have poor stability when exposed to outdoors light. Thus manufactures must either paint the finished part or risk the yellowing or other discoloration of the parts. In order to demonstrate the improved color stability performance of the poly(siloxane-carbonate) and brominated copolycarbonate compositions over those found in art, the compositions were formulated with and without UV stabilization additives in a bright white color package. These compositions and results are shown in Table 11.

TABLE 11

| Component | | EX 40 | EX 41 | EX 42 | EX 43 |
|---|---|---|---|---|---|
| TBBPA-BPA | | 40.0 | 40.0 | 40.0 | 40.0 |
| SiPC 4 | | 50.00 | 50.00 | 50.00 | 50.00 |
| PC 1 | | 10.0 | 10.0 | 10.0 | 10.0 |
| Tinuvin 1577 | | 0 | 0.3 | — | — |
| UVA 234 | | — | — | 0.300 | — |
| Cyasorb 3638 | | — | — | — | 0.3 |
| TiO$_2$ | | 2.0 | 2.0 | 2.0 | 2.0 |
| | | 0.060 | 0.060 | 0.060 | 0.060 |
| Total Formulation | Total wt % Siloxane | 3.00 | 3.00 | 3.00 | 3.00 |
| | Total wt % Bromine | 10.4 | 10.4 | 10.4 | 10.4 |
| Properties | | | | | |
| MVR-6 minutes | | 8.9 | 8.7 | 9.4 | 9.0 |
| MVR-18 minutes | | 8.9 | 11.2 | 10.6 | 9.0 |
| NI-125 RT | Ductility | 100 | 100 | 100 | 100 |
| | J/m | 566 | 542 | 539 | 525 |
| | ft-lbs/in | 10.6 | 10.1 | 10.1 | 9.8 |
| OSU 2 min. | TTF | 26.0 | 21.3 | 23.0 | 18.3 |
| | 60 mil | 19.0 | 17.6 | 25.1 | 21.6 |
| | | 21.0 | 23.8 | 25.7 | 23.4 |
| | Average | 22.0 | 20.9 | 24.6 | 21.1 |
| | Standard Deviation | 3.6 | 3.1 | 1.4 | 2.6 |

TABLE 11-continued

| Component | | EX 40 | EX 41 | EX 42 | EX 43 |
|---|---|---|---|---|---|
| OSU | TTF | 44.0 | 44.7 | 45.1 | 38.4 |
| | 60 mil | 43.2 | 41.8 | 47.3 | 49.4 |
| | | 44.5 | 43.0 | 44.3 | 48.3 |
| | Average | 43.9 | 43.2 | 45.6 | 45.3 |
| | Standard Deviation | 0.7 | 1.5 | 1.5 | 6.0 |
| FAA Smoke De Ds at 4 minutes | TTF | 11.5 | 16.4 | 21.1 | 25.00 |
| | 60 mil | 10.7 | 16.8 | 22.0 | 22.5 |
| | | 11.5 | 27.3 | 23.5 | 20.8 |
| | Ave | 11.2 | 20.2 | 22.2 | 22.8 |
| | Standard Deviation | 0.4 | 6.2 | 1.2 | 2.1 |
| DsMax | TTF | 11.5 | 16.4 | 21.3 | 25.0 |
| | 60 mil | 10.7 | 16.8 | 22.0 | 22.5 |
| | | 11.5 | 27.3 | 23.5 | 20.8 |
| | Ave | 11.2 | 20.2 | 22.3 | 22.8 |
| | Standard Deviation | 0.4 | 6.2 | 1.1 | 2.1 |

All of the compositions were 100% ductile in notched Izod testing, have a density requirement of less than 1.320 g/cc (data not shown), and all showed passing values in the OSU heat release and smoke testing, with OSU values below 65 and smoke $D_{max}$ values below 200.

Bright white sample plaques were placed on a 45 degree angle south facing rack exposed to an unobstructed sunlight light exposure for 466 hours and then tested for a color shift by measuring the reflected light of the light-exposed plaques using a spectrophotometer. The color stability/weathering results are shown in Table 12.

TABLE 12

| Outdoor Exposure, Hrs | Comparative (a) No UVA DE | EX 40 No UVA DE | EX 41 Tinuvin 1577 DE | EX 42 UVA234 DE | EX 43 Cyasorb 3638 DE |
|---|---|---|---|---|---|
| 0 | — | — | — | — | — |
| 110 | 5.9 | 0.3 | 0.3 | 0.5 | 0.5 |
| 466 | 7.9 | 0.7 | 0.6 | 0.4 | 0.3 |

(a) White Lexan* FST9705 plaque. * Trademark of SABIC Innovative Plastics IP BV

All four of the samples (EX40-43) of the present invention have better color stability than the existing commercial OSU comparative resin. All three of the samples containing UV stabilizing additives showed even lower tendency to yellow as determined by lower DE values than the comparative sample or the sample with no UV stabilizers, even after 466 hours. The benefits in color stability of the compositions of the present invention compared to a composition that has comparable OSU smoke and flame performance but employs polyarylate poly(siloxane-carbonate)s in the composition (LEXAN* FST 9705 polymer) is also illustrated by comparing the DE values of EX 40 with FST 9705 after 466 hours of weathering (neither sample contained UV stabilization additive). The FST 9705 showed much higher DE values than CEX 15 (DE 7.9 vs. 0.7).

Ranges disclosed herein are inclusive and combinable (e.g., ranges of "up to 25 wt %, or, more specifically, 5 wt % to 20 wt %," is inclusive of the endpoints and all intermediate values of the ranges of "5 wt % to 25 wt %," etc.). "Combination" is inclusive of compositions, blends, mixtures, alloys, reaction products, and the like. Furthermore, the terms "first," "second," and the like do not denote any order, quantity, or importance, but rather are used to distinguish one element from another, and the terms "a" and "an" herein do not denote a limitation of quantity, but rather denote the presence of at least one of the referenced item. Reference throughout the specification to "an embodiment", "another embodiment", "an embodiment," and so forth, means that a particular element (e.g., feature, formula, and/or characteristic) described in connection with the embodiment is included in at least an embodiment described herein, and can or cannot be present in other embodiments. In addition, it is to be understood that the described elements can be combined in any suitable manner in the various embodiments. The suffix "(s)" as used herein is intended to include both the singular and the plural of the term that it modifies, thereby including at least one of that term (e.g., the colorant(s) includes at least one colorants).

Compounds are described using standard nomenclature. For example, any position not substituted by any indicated group is understood to have its valency filled by a bond as indicated, or a hydrogen atom. A dash ("—") that is not between two letters or symbols is used to indicate a point of attachment for a substituent. For example, —CHO is attached through carbon of the carbonyl group. The term "alkyl" includes both $C_{1-30}$ branched and straight chain, unsaturated aliphatic hydrocarbon groups having the specified number of carbon atoms. Examples of alkyl include, but are not limited to, methyl, ethyl, n-propyl, i-propyl, n-butyl, s-butyl, t-butyl, n-pentyl, s-pentyl, n- and s-hexyl, n- and s-heptyl, and, n- and s-octyl. The term "aryl" means an aromatic moiety containing the specified number of carbon atoms, such as to phenyl, tropone, indanyl, or naphthyl. The term "hydrocarbon group" encompasses groups containing the specified number of carbon atoms and having carbon, hydrogen, and optionally one to three heteroatoms selected from O, S, P, and N. Hydrocarbon groups can contain saturated, unsaturated, or aromatic moieties, or a combination comprising any of the foregoing, e.g., an alkyl moiety and an aromatic moiety. The term "aromatic group" includes groups having an aromatic moiety, optionally together with a saturated or unsaturated moiety.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

While the invention has been described with reference to embodiments, it will be understood by those skilled in the art that various changes can be made and equivalents can be substituted for elements thereof without departing from the scope of the invention. In addition, many modifications can be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

We claim:

1. A composition comprising:
   a first polycarbonate comprising a poly(siloxane-carbonate) derived from at least one dihydroxy aromatic compound of formula (5)

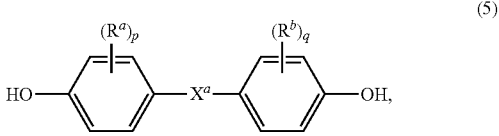

and at least one polysiloxane bisphenol of formula (1) or formula (2)

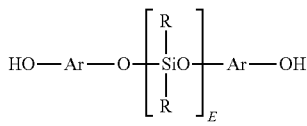
(1)

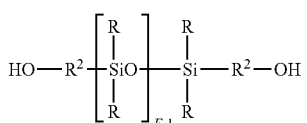
(2)

wherein
each of $R^a$ and $R^b$ is independently a halogen atom or a monovalent hydrocarbon group,
p and q are each independently integers of 0 to 4,
$X^a$ represents a single bond or one of the groups of formulas (6) or (7),

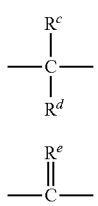
(6)

(7)

wherein each $R^c$ and $R^d$ is independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl, and $R^e$ is a divalent $C_{1-12}$ hydrocarbon group,
R is each independently a $C_1$-$C_{30}$ hydrocarbon group,
$R^2$ is each independently a $C_7$-$C_{30}$ hydrocarbon group,
Ar is a $C_6$-$C_{30}$ aromatic group, and
E has an average value of 5 to 200;
a second polycarbonate different from the first polycarbonate, the second polycarbonate comprising
brominated carbonate units derived from 2,2',6,6'-tetrabromo-4,4'-isopropylidenediphenol and
carbonate units derived from at least one dihydroxy aromatic compound that is not 2,2',6,6'-tetrabromo-4,4'-isopropylidenediphenol; and
optionally, a third polycarbonate different from the first and second polycarbonate;
wherein the composition is free of copolymers comprising carbonate units and ester units; and wherein
the wt % of the first polycarbonate, second polycarbonate, and optional third polycarbonate sum to 100 wt %,
the first polycarbonate is present in an amount effective to provide the siloxane units in an amount of at least 0.3 wt %, based on the sum of the wt % of the first, second, and optional third polycarbonate, and
the second polycarbonate is present in an amount effective to provide the bromine of the second polycarbonate in an amount of at least 7.8 wt %, based on the sum of the wt % of the first, second, and optional third polycarbonate; and further wherein an article molded from the composition has
an OSU integrated 2 minute heat release test value of less than 65 kW-min/m² and a peak heat release rate of less than 65 kW/m² as measured using the method of FAR F25.4, in accordance with Federal Aviation Regulation FAR 25.853 (d), and
an E662 smoke test Dmax value of less than 200 when measured at a thickness of 1.6 mm.

2. The composition of claim 1, wherein the first polycarbonate is present in an amount of at least 10 wt %, and the second polycarbonate is present in an amount of at least 20 wt %, each based on the sum of the wt % of the first, second, and optional third polycarbonate.

3. The composition of claim 1, wherein
E in formula (1) and formula (2) has an average value of 25 to 75,
the siloxane units of the first polycarbonate are present in an amount of at least 2.0 wt %, based on the sum of the wt % of the first, second, and optional third polycarbonate, and
an article molded from the composition further has a room temperature notched Izod impact of greater than 500 J/m as measured according to ASTM D 256-10 at a 0.125 inch (3.2 mm) thickness.

4. The composition of claim 3 wherein the first polycarbonate is derived from bisphenol A and formula 2 and wherein formula 2 has the formula

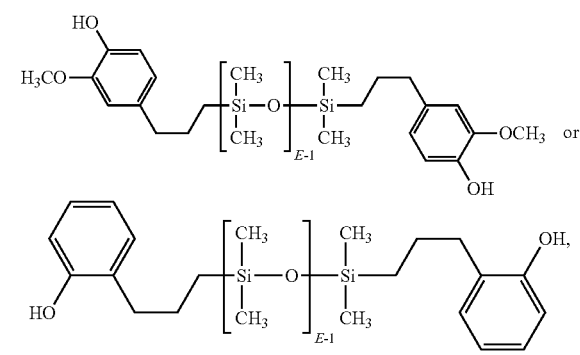

wherein
E has an average value of between 40 to 50, and
the siloxane units of the first polycarbonate are present in an amount of 2 to 30 wt % based on the total weight of the first polycarbonate.

5. The composition of claim 1, wherein
E in formula 1 and formula 2 has an average value of 25 to 50,
the siloxane units of the first polycarbonate are present in an amount of at least 2.0 wt %, based on the sum of the wt % of the first, second, and optional third polycarbonate,
the second polycarbonate is present in an amount of 35 to 50 wt %, based on the sum of the wt % of the first, second, and optional third polycarbonate, and
an article molded from the composition further has a haze less of less than 10% and a transmission greater than 70%, each measured using the color space CIE1931 (Illuminant C and a 2° observer) at a 0.125 inch (3.2 mm) thickness.

6. The composition of claim 5 wherein the first polycarbonate is derived from bisphenol A and formula 2 and wherein formula 2 has the formula

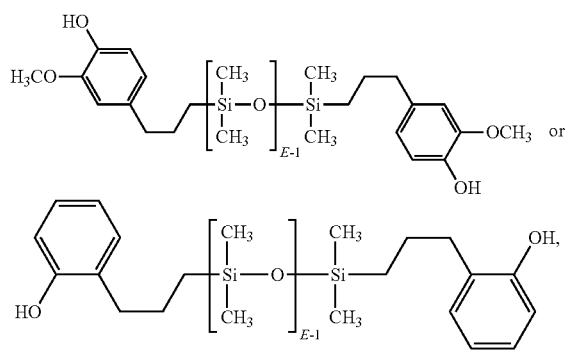

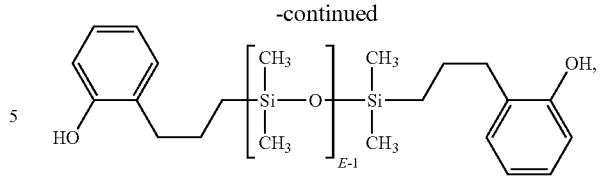

wherein

E has an average value of between 40 to 50, and the siloxane units of the first polycarbonate are present in an amount of 4 to 8 wt % based on the total weight of the first polycarbonate.

7. An article selected from a molded article, a thermoformed article, an extruded film, an extruded sheet, one or more layers of a multi-layer article, a substrate for a coated article or a substrate for a metallized article made from the composition of claim 5.

8. The article of claim 7, wherein the article is selected from a balcony component, baluster, ceiling panel, cover for a life vest, cover for a storage bin, dust cover for a window, layer of an electrochromic device, lens for a television, electronic display, gauge, instrument panel, light cover, light diffuser, light tube, light pipes, mirror, partition, railing, refrigerator door, shower door, sink bowl, trolley cart container, trolley cart side panel, or window.

9. The composition of claim 1, wherein the polysiloxane bisphenol (1) has the formula:

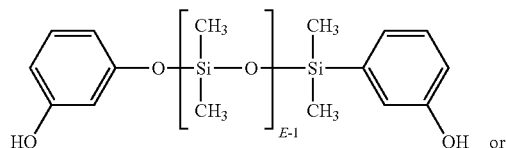

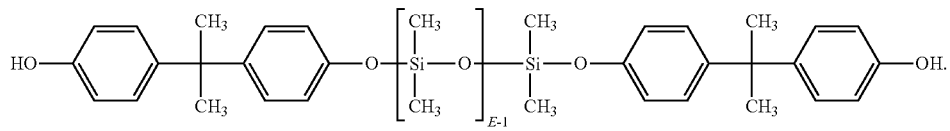

10. The composition of claim 1, wherein the polysiloxane bisphenol (2) has the formula:

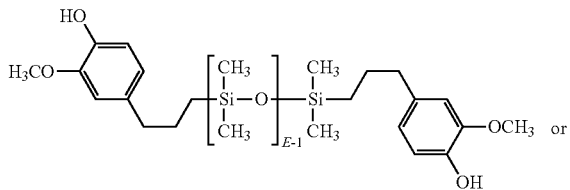

11. The composition of claim 10 wherein the dihydroxy aromatic compound of the first polycarbonate is Bisphenol-A.

12. The composition of claim 1, wherein the siloxane units of the first polycarbonate are present in an amount of between 1.5 and 3.5 wt % based on the sum of the wt % of the first, second, and third polycarbonate, the bromine of the second polycarbonate is present in an amount of between 7.8 and 13 wt % based on the sum of the wt % of the first, second, and third polycarbonate; and the third polycarbonate is present in an amount of 8 to 50 wt % based on the sum of the first, second, and third polycarbonate.

13. The composition of claim 1, wherein the at least one dihydroxy aromatic compound of the second polycarbonate is Bisphenol-A.

14. The composition of claim 13, wherein the second polycarbonate comprises 25 to 35 mol % of units derived from 2,2'6,6' tetrabromo-4,4'-isopropylidenediphenol and 65 to 75 mole % of units derived from Bisphenol-A.

15. The composition of claim 1 wherein the first polycarbonate is derived from bisphenol A and formula 2 and wherein formula 2 has the formula

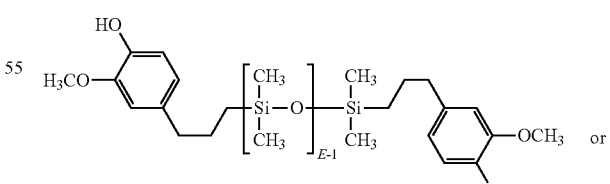

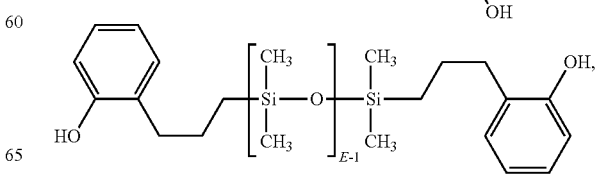

wherein
E has an average value of 8 to 100,
the siloxane units of the first polycarbonate are present in an amount of 0.5 to 25 wt % based on the total weight of the first polycarbonate.

16. The composition of claim 1, wherein the composition has a density of less than 1.31 g/cc.

17. The composition of claim 16, wherein the composition has a density of less than 1.30 g/cc.

18. The composition of claim 1, wherein the E662 smoke test Dmax has a value of less than 100 when tested at a thickness of 1.6 mm.

19. The composition of claim 1, wherein an article molded from the composition has a room temperature notched Izod impact of greater than 500 J/m as measured according to ASTM D 256-10 at a 3.2 mm thickness.

20. The composition of claim 19, wherein the E662 smoke test Dmax has a value of less than 100 when tested at a thickness of 1.6 mm.

21. The composition of claim 1, wherein an article molded from the composition has a haze less of less than 15% and a transmission greater than 75%, each measured using the color space CIE1931 (Illuminant C and a 2° observer) at a 3.2 mm thickness.

22. The composition of claim 21, wherein an article molded from the composition has a room temperature notched Izod impact of greater than 500 J/m as measured according to ASTM D 256-10 at a 3.2 mm thickness.

23. The composition of claim 1, further comprising 0.5 to 3 parts by weight of titanium dioxide per hundred parts by weight of the combination of the wt % of the first, second, and optional third polycarbonate.

24. The composition of claim 1, wherein the composition is substantially free of a fluorinated polyolefin encapsulated by poly(styrene-acrylonitrile).

25. The composition of claim 1, further comprising an additional polymer comprising bromine, wherein the additional polymer is not the same as the first polycarbonate, the second polycarbonate, or the optional third polycarbonate; and wherein the additional polymer is present at 0.01 to 25 parts per hundred parts by weight of the combination of the first polycarbonate, the second polycarbonate, and the optional third polycarbonate.

26. An article selected from a molded article, a thermoformed article, a foamed article, an extruded film, an extruded sheet, one or more layers of a multi-layer article, a substrate for a coated article or a substrate for a metallized article made from the composition of claim 1.

27. The article of claim 26, wherein the article is a component of an aircraft interior or a train interior.

28. The article of claim 27, wherein the article is selected from an access panel, access door, air flow regulator, air gasper, air grille, arm rest, baggage storage door, balcony component, cabinet wall, ceiling panel, door pull, door handle, duct housing, enclosure for an electronic device, equipment housing, equipment panel, floor panel, food cart, food tray, galley surface, handle, housing for television, light panel, magazine rack, telephone housing, partition, part for trolley cart, seat back, seat component, railing component, seat housing, shelve, side wall, speaker housing, storage compartment, storage housing, toilet seat, tray table, tray, trim panel, window molding, window slide, or window.

29. The composition of claim 1, wherein the first polycarbonate is a blend of a first poly(siloxane-carbonate) and a second poly(siloxane-carbonate) different from the first poly(siloxane-carbonate), wherein the first and the second poly(siloxane-carbonate)s are independently derived from at least one dihydroxy aromatic compound of formula (5) and at least one polysiloxane bisphenol of formula (1) or formula (2).

30. The composition of claim 1, wherein the third polycarbonate is a homopolymer with bisphenol A carbonate units.

31. A composition comprising:
a first polycarbonate comprising a poly(siloxane-carbonate) derived from at least one dihydroxy aromatic compound of formula (5)

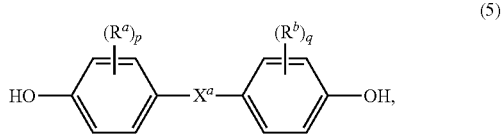

and at least one polysiloxane bisphenol of formula (1) or formula (2)

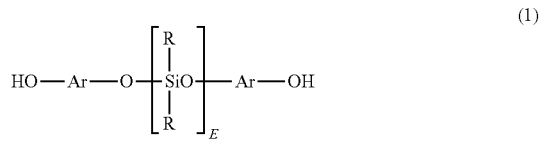

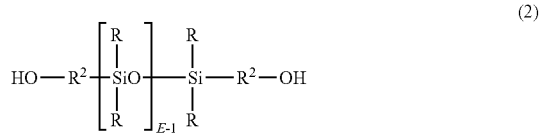

where
each of $R^a$ and $R^b$ is independently a halogen atom or a monovalent hydrocarbon group,
p and q are each independently integers of 0 to 4,
$X^a$ represents a single bond or one of the groups of formulas (6) or (7),

wherein each $R^c$ and $R^d$ is independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl, and $R^e$ is a divalent $C_{1-12}$ hydrocarbon group,
R is each independently a $C_1$-$C_{30}$ hydrocarbon group,
Ar is a $C_6$-$C_{30}$ aromatic group, and
$R^2$ is each independently a $C_7$-$C_{30}$ hydrocarbon group, and
E has an average value of 5 to 75;
a second polycarbonate different from the first polycarbonate, the second polycarbonate comprising
brominated carbonate units derived from 2,2',6,6'-tetrabromo-4,4'-isopropylidenediphenol and
carbonate units derived from at least one dihydroxy aromatic compound that is not 2,2',6,6'-tetrabromo-4,4'-isopropylidenediphenol; and optionally, a third polycarbonate different from the first and second polycarbonate;
wherein the composition is free of copolymers comprising carbonate units and ester units; and
wherein
the wt % of the first polycarbonate, second polycarbonate, and optional third polycarbonate sum to 100 wt %,
the first polycarbonate is present in an amount effective to provide the siloxane units of the first polycarbonate in an amount of at least 0.3 wt %, based on the sum of the wt % of the first, second, and optional third polycarbonate, and
the second polycarbonate is present in an amount effective to provide bromine in the second polycarbonate in an amount of at least 5.0 wt %, based on the sum of the wt % of the first, second, and optional third polycarbonate; and
further wherein an article molded from the composition has
an OSU integrated 2 minute heat release test value of less than 65 kW-min/m² and a peak heat release rate of less than 65 kW/m² as measured using the method of FAR F25.4, in accordance with Federal Aviation Regulation FAR 25.853 (d),
an E662 smoke test Dmax value of less than 200 when tested at a thickness of 1.6 mm; and
a haze less of less than 3% and a transmission greater than 85%, each measured using the color space CIE1931 (Illuminant C and a 2° observer) at a 1.5 mm thickness.

32. The composition of claim 31, wherein the first polycarbonate is present in an amount of at least 30 wt %, and the second polycarbonate is present in an amount of at least 20 wt %, each based on the sum of the wt % of the first, second, and optional third polycarbonate.

33. The composition of claim 31 wherein the first polycarbonate is derived from bisphenol A and formula 2 and wherein formula 2 has the formula

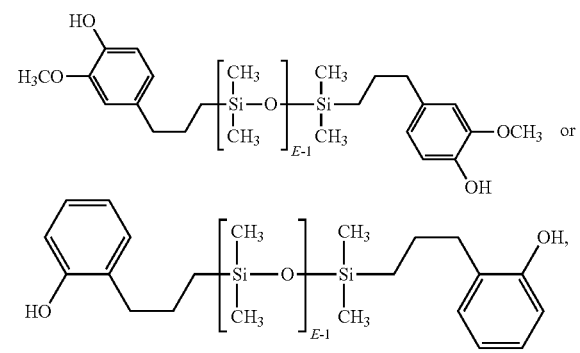

wherein
E has an average value of 8 to 12, and
the siloxane units of the first polycarbonate are present in an amount of 0.5 to 7 wt % based on the total weight of the first polycarbonate.

34. The composition of claim 31, wherein the third polycarbonate is a homopolymer with bisphenol A carbonate units.

* * * * *